(12) United States Patent
Vobbilisetty et al.

(10) Patent No.: US 10,419,276 B2
(45) Date of Patent: Sep. 17, 2019

(54) ADVANCED LINK TRACKING FOR VIRTUAL CLUSTER SWITCHING

(71) Applicant: AVAGO TECHNOLOGIES INTERNATIONAL SALES PTE. LIMITED, Singapore (SG)

(72) Inventors: Suresh Vobbilisetty, San Jose, CA (US); Phanidhar Koganti, Fremont, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 133 days.

(21) Appl. No.: 15/694,516

(22) Filed: Sep. 1, 2017

(65) Prior Publication Data
US 2018/0013614 A1    Jan. 11, 2018

Related U.S. Application Data

(63) Continuation of application No. 13/092,460, filed on Apr. 22, 2011, now Pat. No. 9,769,016.
(Continued)

(51) Int. Cl.
*H04L 12/24* (2006.01)
*H04L 12/46* (2006.01)
(Continued)

(52) U.S. Cl.
CPC ...... *H04L 41/0677* (2013.01); *H04L 12/4641* (2013.01); *H04L 45/02* (2013.01);
(Continued)

(58) Field of Classification Search
None
See application file for complete search history.

(56) References Cited

U.S. PATENT DOCUMENTS

| 829,529 A | 8/1906 | Keathley |
|---|---|---|
| 5,390,173 A | 2/1995 | Spinney |

(Continued)

FOREIGN PATENT DOCUMENTS

| CN | 1735062 | 2/2006 |
|---|---|---|
| CN | 1777149 | 5/2006 |

(Continued)

OTHER PUBLICATIONS

Eastlake, D. et al., 'RBridges: TRILL Header Options', Dec. 24, 2009, pp. 1-17, TRILL Working Group.
(Continued)

*Primary Examiner* — Diane L Lo
(74) *Attorney, Agent, or Firm* — Xsensus, LLP

(57) ABSTRACT

One embodiment of the present invention provides a switch system. The switch includes a port that couples to a server hosting a number of virtual machines. The switch also includes a link tracking module. During operation, the link tracking module determines that reachability to at least one end host coupled to a virtual cluster switch of which the switch is a member is disrupted. The link tracking module then determines that at least one virtual machine coupled to the port is affected by the disrupted reachability, and communicates to the server hosting the affected virtual machine about the disrupted reachability.

20 Claims, 15 Drawing Sheets

Related U.S. Application Data

(60) Provisional application No. 61/352,255, filed on Jun. 7, 2010.

(51) Int. Cl.
  *H04L 12/931* (2013.01)
  *H04L 12/939* (2013.01)
  *H04L 12/713* (2013.01)
  *H04L 12/751* (2013.01)

(52) U.S. Cl.
  CPC .......... *H04L 45/586* (2013.01); *H04L 49/555* (2013.01); *H04L 49/70* (2013.01)

(56) References Cited

U.S. PATENT DOCUMENTS

| | | |
|---|---|---|
| 5,802,278 A | 9/1998 | Isfeld |
| 5,878,232 A | 3/1999 | Marimuthu |
| 5,879,173 A | 3/1999 | Poplawski |
| 5,959,968 A | 9/1999 | Chin |
| 5,973,278 A | 10/1999 | Wehrill, III |
| 5,983,278 A | 11/1999 | Chong |
| 5,995,262 A | 11/1999 | Hirota |
| 6,041,042 A | 3/2000 | Bussiere |
| 6,085,238 A | 7/2000 | Yuasa |
| 6,092,062 A | 7/2000 | Lohman |
| 6,104,696 A | 8/2000 | Kadambi |
| 6,122,639 A | 9/2000 | Babu |
| 6,185,214 B1 | 2/2001 | Schwartz |
| 6,185,241 B1 | 2/2001 | Sun |
| 6,295,527 B1 | 9/2001 | McCormack |
| 6,331,983 B1 | 12/2001 | Haggerty |
| 6,438,106 B1 | 8/2002 | Pillar |
| 6,498,781 B1 | 12/2002 | Bass |
| 6,542,266 B1 | 4/2003 | Phillips |
| 6,553,029 B1 | 4/2003 | Alexander |
| 6,571,355 B1 | 5/2003 | Linnell |
| 6,583,902 B1 | 6/2003 | Yuen |
| 6,633,761 B1 | 10/2003 | Singhal |
| 6,636,963 B1 | 10/2003 | Stein |
| 6,771,610 B1 | 8/2004 | Seaman |
| 6,816,462 B1 | 11/2004 | Booth, III |
| 6,870,840 B1 | 3/2005 | Hill |
| 6,873,602 B1 | 3/2005 | Ambe |
| 6,920,503 B1 | 7/2005 | Nanji |
| 6,937,576 B1 | 8/2005 | DiBenedetto |
| 6,956,824 B2 | 10/2005 | Mark |
| 6,957,269 B2 | 10/2005 | Williams |
| 6,975,581 B1 | 12/2005 | Medina |
| 6,975,864 B2 | 12/2005 | Singhal |
| 7,016,352 B1 | 3/2006 | Chow |
| 7,061,877 B1 | 6/2006 | Gummalla |
| 7,062,177 B1 | 6/2006 | Grivna |
| 7,097,308 B2 | 8/2006 | Kim et al. |
| 7,173,934 B2 | 2/2007 | Lapuh |
| 7,197,308 B2 | 3/2007 | Singhal |
| 7,206,288 B2 | 4/2007 | Cometto |
| 7,274,694 B1 | 9/2007 | Cheng |
| 7,310,664 B1 | 12/2007 | Merchant |
| 7,313,637 B2 | 12/2007 | Tanaka |
| 7,315,545 B1 | 1/2008 | Chowdhury et al. |
| 7,316,031 B2 | 1/2008 | Griffith |
| 7,330,897 B2 | 2/2008 | Baldwin |
| 7,380,025 B1 | 5/2008 | Riggins |
| 7,397,768 B1 | 7/2008 | Betker |
| 7,397,794 B1 | 7/2008 | Lacroute |
| 7,430,164 B2 | 9/2008 | Bare |
| 7,453,888 B2 | 11/2008 | Zabihi |
| 7,477,894 B1 | 1/2009 | Sinha |
| 7,480,258 B1 | 1/2009 | Shuen |
| 7,508,757 B2 | 3/2009 | Ge |
| 7,558,195 B1 | 7/2009 | Kuo |
| 7,558,273 B1 | 7/2009 | Grosser |
| 7,571,447 B2 | 8/2009 | Ally |
| 7,599,901 B2 | 10/2009 | Mital |
| 7,653,056 B1 | 1/2010 | Dianes |
| 7,688,736 B1 | 3/2010 | Walsh |
| 7,688,960 B1 | 3/2010 | Aubuchon |
| 7,690,040 B2 | 3/2010 | Frattura |
| 7,706,255 B1 | 4/2010 | Kondrat et al. |
| 7,716,370 B1 | 5/2010 | Devarapalli |
| 7,720,076 B2 | 5/2010 | Dobbins |
| 7,729,296 B1 | 6/2010 | Choudhary |
| 7,787,480 B1 | 8/2010 | Mehta |
| 7,792,920 B2 | 9/2010 | Istvan |
| 7,796,593 B1 | 9/2010 | Ghosh |
| 7,801,021 B1 | 9/2010 | Triantafillis |
| 7,808,992 B2 | 10/2010 | Homchaudhuri |
| 7,836,332 B2 | 11/2010 | Hara |
| 7,843,906 B1 | 11/2010 | Chidambaram et al. |
| 7,843,907 B1 | 11/2010 | Abou-Emara |
| 7,860,097 B1 | 12/2010 | Lovett |
| 7,898,959 B1 | 3/2011 | Arad |
| 7,912,091 B1 | 3/2011 | Krishnan |
| 7,924,837 B1 | 4/2011 | Shabtay |
| 7,937,438 B1 | 5/2011 | Miller |
| 7,937,756 B2 | 5/2011 | Kay |
| 7,945,941 B2 | 5/2011 | Sinha |
| 7,949,638 B1 | 5/2011 | Goodson |
| 7,957,386 B1 | 6/2011 | Aggarwal |
| 8,018,938 B1 | 9/2011 | Fromm |
| 8,027,354 B1 | 9/2011 | Portolani |
| 8,054,832 B1 | 11/2011 | Shukla |
| 8,068,442 B1 | 11/2011 | Kompella |
| 8,078,704 B2 | 12/2011 | Lee |
| 8,090,805 B1 | 1/2012 | Chawla |
| 8,102,781 B2 | 1/2012 | Smith |
| 8,116,307 B1 | 2/2012 | Thesayi |
| 8,125,928 B2 | 2/2012 | Mehta |
| 8,134,922 B2 | 3/2012 | Elangovan |
| 8,155,150 B1 | 4/2012 | Chung |
| 8,160,063 B2 | 4/2012 | Maltz |
| 8,160,080 B1 | 4/2012 | Arad |
| 8,170,038 B2 | 5/2012 | Belanger |
| 8,175,107 B1 | 5/2012 | Yalagandula |
| 8,095,774 B1 | 6/2012 | Lambeth |
| 8,194,674 B1 | 6/2012 | Pagel |
| 8,195,774 B2 | 6/2012 | Lambeth |
| 8,204,061 B1 | 6/2012 | Sane |
| 8,213,313 B1 | 7/2012 | Doiron |
| 8,213,336 B2 | 7/2012 | Smith |
| 8,230,069 B2 | 7/2012 | Korupolu |
| 8,239,960 B2 | 8/2012 | Frattura |
| 8,249,069 B2 | 8/2012 | Raman |
| 8,270,401 B1 | 9/2012 | Barnes |
| 8,295,291 B1 | 10/2012 | Ramanathan |
| 8,295,921 B2 | 10/2012 | Wang |
| 8,301,686 B1 | 10/2012 | Appajodu |
| 8,339,994 B2 | 12/2012 | Gnanasekaran |
| 8,351,352 B1 | 1/2013 | Eastlake |
| 8,369,335 B2 | 2/2013 | Jha |
| 8,369,347 B2 | 2/2013 | Xiong |
| 8,392,496 B2 | 3/2013 | Linden |
| 8,451,717 B2 | 5/2013 | Venkataraman |
| 8,462,774 B2 | 6/2013 | Page |
| 8,465,774 B2 | 6/2013 | Page |
| 8,467,375 B2 | 6/2013 | Blair |
| 8,520,595 B2 | 8/2013 | Yadav |
| 8,553,710 B1 | 10/2013 | White |
| 8,595,479 B2 | 11/2013 | Radhakrishnan |
| 8,599,850 B2 | 12/2013 | J Ha |
| 8,599,864 B2 | 12/2013 | Chung |
| 8,615,008 B2 | 12/2013 | Natarajan |
| 8,619,788 B1 | 12/2013 | Sankaran |
| 8,625,616 B2 | 1/2014 | Vobbilisetty |
| 8,705,526 B1 | 4/2014 | Hasan |
| 8,706,905 B1 | 4/2014 | McGlaughlin |
| 8,717,895 B2 | 5/2014 | Koponen |
| 8,724,456 B1 | 5/2014 | Hong |
| 8,792,501 B1 | 7/2014 | Rustagi |
| 8,798,045 B1 | 8/2014 | Aybay |
| 8,798,055 B1 | 8/2014 | An |
| 8,804,732 B1 | 8/2014 | Hepting |
| 8,804,736 B1 | 8/2014 | Drake |

(56) References Cited

U.S. PATENT DOCUMENTS

| | | |
|---|---|---|
| 8,806,031 B1 | 8/2014 | Kondur |
| 8,826,385 B2 | 9/2014 | Congdon |
| 8,918,631 B1 | 12/2014 | Kumar |
| 8,937,865 B1 | 1/2015 | Kumar |
| 8,948,181 B2 | 2/2015 | Kapadia |
| 8,971,173 B1 | 3/2015 | Choudhury |
| 8,995,272 B2 | 3/2015 | Agarwal |
| 9,019,976 B2 | 4/2015 | Gupta |
| 9,178,793 B1 | 11/2015 | Marlow |
| 9,231,890 B2 | 1/2016 | Vobbilisetty |
| 9,350,680 B2 | 5/2016 | Thayalan |
| 9,401,818 B2 | 7/2016 | Venkatesh |
| 9,438,447 B2 | 9/2016 | Basso |
| 9,450,870 B2 | 9/2016 | Ananthapadmanabha |
| 9,524,173 B2 | 12/2016 | Guntaka |
| 9,626,255 B2 | 4/2017 | Guntaka |
| 9,628,407 B2 | 4/2017 | Guntaka |
| 2001/0005527 A1 | 6/2001 | Vaeth |
| 2001/0055274 A1 | 12/2001 | Hegge |
| 2002/0019904 A1 | 2/2002 | Katz |
| 2002/0021701 A1 | 2/2002 | Lavian |
| 2002/0027885 A1 | 3/2002 | Ben-Ami |
| 2002/0039350 A1 | 4/2002 | Wang |
| 2002/0054593 A1 | 5/2002 | Morohashi |
| 2002/0087723 A1 | 7/2002 | Williams |
| 2002/0091795 A1 | 7/2002 | Yip |
| 2002/0138628 A1 | 9/2002 | Tingley |
| 2002/0161867 A1 | 10/2002 | Cochran |
| 2003/0026290 A1 | 2/2003 | Umayabashi |
| 2003/0041085 A1 | 2/2003 | Sato |
| 2003/0093567 A1 | 5/2003 | Lolayekar |
| 2003/0097464 A1 | 5/2003 | Martinez |
| 2003/0097470 A1 | 5/2003 | Lapuh |
| 2003/0123393 A1 | 7/2003 | Feuerstraeter |
| 2003/0147385 A1 | 8/2003 | Montalvo |
| 2003/0152075 A1 | 8/2003 | Hawthorne |
| 2003/0174706 A1 | 9/2003 | Shankar |
| 2003/0189905 A1 | 10/2003 | Lee |
| 2003/0189930 A1 | 10/2003 | Terrell |
| 2003/0208616 A1 | 11/2003 | Laing |
| 2003/0216143 A1 | 11/2003 | Roese |
| 2003/0223428 A1 | 12/2003 | BlanquerGonzalez |
| 2003/0233534 A1 | 12/2003 | Bernhard |
| 2004/0001433 A1 | 1/2004 | Gram |
| 2004/0003094 A1 | 1/2004 | See |
| 2004/0010600 A1 | 1/2004 | Baldwin |
| 2004/0088668 A1 | 1/2004 | Bornowski |
| 2004/0037295 A1 | 2/2004 | Tanaka |
| 2004/0047349 A1 | 3/2004 | Fujita |
| 2004/0049699 A1 | 3/2004 | Griffith |
| 2004/0057430 A1 | 3/2004 | Paavolainen |
| 2004/0081171 A1 | 4/2004 | Finn |
| 2004/0088437 A1 | 5/2004 | Stimac |
| 2004/0095900 A1 | 5/2004 | Siegel |
| 2004/0117508 A1 | 6/2004 | Shimizu |
| 2004/0120326 A1 | 6/2004 | Yoon |
| 2004/0156313 A1 | 8/2004 | Hofmeister et al. |
| 2004/0165595 A1 | 8/2004 | Holmgren |
| 2004/0165596 A1 | 8/2004 | Garcia |
| 2004/0205234 A1 | 10/2004 | Barrack |
| 2004/0213232 A1 | 10/2004 | Regan |
| 2004/0225725 A1 | 11/2004 | Enomoto |
| 2004/0243673 A1 | 12/2004 | Goyal |
| 2005/0007951 A1 | 1/2005 | Lapuh |
| 2005/0025179 A1 | 2/2005 | McLaggan |
| 2005/0036488 A1 | 2/2005 | Kalkunte |
| 2005/0044199 A1 | 2/2005 | Shiga |
| 2005/0074001 A1 | 4/2005 | Mattes |
| 2005/0094568 A1 | 5/2005 | Judd |
| 2005/0094630 A1 | 5/2005 | Valdevit |
| 2005/0108375 A1 | 5/2005 | Hallak-Stamler |
| 2005/0111352 A1 | 5/2005 | Ho |
| 2005/0122979 A1 | 6/2005 | Gross |
| 2005/0152335 A1 | 7/2005 | Lodha |
| 2005/0157645 A1 | 7/2005 | Rabie et al. |
| 2005/0157751 A1 | 7/2005 | Rabie |
| 2005/0169188 A1 | 8/2005 | Cometto |
| 2005/0195813 A1 | 9/2005 | Ambe |
| 2005/0207423 A1 | 9/2005 | Herbst |
| 2005/0213561 A1 | 9/2005 | Yao |
| 2005/0220096 A1 | 10/2005 | Friskney |
| 2005/0259586 A1 | 11/2005 | Hafid |
| 2005/0265330 A1 | 12/2005 | Suzuki |
| 2005/0265356 A1 | 12/2005 | Kawarai |
| 2005/0278565 A1 | 12/2005 | Frattura |
| 2006/0007869 A1 | 1/2006 | Hirota |
| 2006/0018302 A1 | 1/2006 | Ivaldi |
| 2006/0023707 A1 | 2/2006 | Makishima |
| 2006/0029055 A1 | 2/2006 | Perera |
| 2006/0034292 A1 | 2/2006 | Wakayama |
| 2006/0036648 A1 | 2/2006 | Frey |
| 2006/0036765 A1 | 2/2006 | Weyman |
| 2006/0039366 A1 | 2/2006 | Ghosh |
| 2006/0059163 A1 | 3/2006 | Frattura |
| 2006/0062187 A1 | 3/2006 | Rune |
| 2006/0072550 A1 | 4/2006 | Davis |
| 2006/0083172 A1 | 4/2006 | Jordan |
| 2006/0083254 A1 | 4/2006 | Ge |
| 2006/0092860 A1 | 5/2006 | Higashitaniguchi |
| 2006/0098589 A1 | 5/2006 | Kreeger |
| 2006/0126511 A1 | 6/2006 | Youn |
| 2006/0140130 A1 | 6/2006 | Kalkunte |
| 2006/0155828 A1 | 7/2006 | Ikeda |
| 2006/0168109 A1 | 7/2006 | Warmenhoven |
| 2006/0184937 A1 | 8/2006 | Abels |
| 2006/0206655 A1 | 9/2006 | Chappell |
| 2006/0209886 A1 | 9/2006 | Silberman |
| 2006/0221960 A1 | 10/2006 | Borgione |
| 2006/0227776 A1 | 10/2006 | Chandrasekaran |
| 2006/0235995 A1 | 10/2006 | Bhatia |
| 2006/0242311 A1 | 10/2006 | Mai |
| 2006/0242398 A1 | 10/2006 | Fontijn |
| 2006/0245439 A1 | 11/2006 | Sajassi |
| 2006/0251067 A1 | 11/2006 | DeSanti |
| 2006/0256767 A1 | 11/2006 | Suzuki |
| 2006/0265515 A1 | 11/2006 | Shiga |
| 2006/0285499 A1 | 12/2006 | Tzeng |
| 2006/0291388 A1 | 12/2006 | Amdahl |
| 2006/0291480 A1 | 12/2006 | Cho |
| 2006/0294413 A1 | 12/2006 | Filz |
| 2007/0036178 A1 | 2/2007 | Hares |
| 2007/0053294 A1 | 3/2007 | Ho |
| 2007/0061817 A1 | 3/2007 | Atkinson |
| 2007/0074052 A1 | 3/2007 | Hemmah |
| 2007/0081530 A1 | 4/2007 | Nomura |
| 2007/0083625 A1 | 4/2007 | Chamdani |
| 2007/0086362 A1 | 4/2007 | Kato |
| 2007/0094464 A1 | 4/2007 | Sharma |
| 2007/0097871 A1* | 5/2007 | Boyd ................. G06F 11/0712 370/242 |
| 2007/0097968 A1 | 5/2007 | Du |
| 2007/0098006 A1 | 5/2007 | Parry |
| 2007/0110068 A1 | 5/2007 | Sekiguchi |
| 2007/0116224 A1 | 5/2007 | Burke |
| 2007/0116422 A1 | 5/2007 | Reynolds |
| 2007/0121617 A1 | 5/2007 | Kanekar |
| 2007/0130295 A1 | 6/2007 | Rastogi |
| 2007/0156659 A1 | 7/2007 | Lim |
| 2007/0177525 A1 | 8/2007 | Wijnands |
| 2007/0177597 A1 | 8/2007 | Ju |
| 2007/0183313 A1 | 8/2007 | Narayanan |
| 2007/0183393 A1 | 8/2007 | Boyd |
| 2007/0206762 A1 | 9/2007 | Chandra |
| 2007/0211712 A1 | 9/2007 | Fitch |
| 2007/0220059 A1 | 9/2007 | Lu |
| 2007/0226214 A1 | 9/2007 | Smits |
| 2007/0230472 A1 | 10/2007 | Jesuraj |
| 2007/0238343 A1 | 10/2007 | Velleca |
| 2007/0258449 A1 | 11/2007 | Bennett |
| 2007/0274234 A1 | 11/2007 | Kubota |
| 2007/0280223 A1 | 12/2007 | Pan |
| 2007/0289017 A1 | 12/2007 | Copeland, III |
| 2007/0297406 A1 | 12/2007 | Rooholamini |
| 2008/0052487 A1 | 2/2008 | Akahane |

(56) References Cited

U.S. PATENT DOCUMENTS

| | | |
|---|---|---|
| 2008/0056135 A1 | 3/2008 | Lee |
| 2008/0056300 A1 | 3/2008 | Williams |
| 2008/0057918 A1 | 3/2008 | Abrant |
| 2008/0065760 A1 | 3/2008 | Damm |
| 2008/0075078 A1 | 3/2008 | Watanabe |
| 2008/0080517 A1 | 4/2008 | Roy |
| 2008/0095160 A1 | 4/2008 | Yadav |
| 2008/0101386 A1 | 5/2008 | Gray |
| 2008/0112133 A1 | 5/2008 | Torudbakken |
| 2008/0112400 A1 | 5/2008 | Dunbar et al. |
| 2008/0133760 A1 | 6/2008 | Berkvens |
| 2008/0159260 A1 | 7/2008 | Vobbilisetty |
| 2008/0159277 A1 | 7/2008 | Vobbilisetty |
| 2008/0165705 A1 | 7/2008 | Umayabashi |
| 2008/0172492 A1 | 7/2008 | Raghunath |
| 2008/0181196 A1 | 7/2008 | Regan |
| 2008/0181243 A1 | 7/2008 | Vobbilisetty |
| 2008/0186968 A1 | 8/2008 | Farinacci |
| 2008/0186981 A1 | 8/2008 | Seto |
| 2008/0205377 A1 | 8/2008 | Chao |
| 2008/0219172 A1 | 9/2008 | Mohan |
| 2008/0225852 A1 | 9/2008 | Raszuk |
| 2008/0228897 A1 | 9/2008 | Ko |
| 2008/0240129 A1 | 10/2008 | Elmeleegy |
| 2008/0253380 A1 | 10/2008 | Cazares |
| 2008/0267179 A1 | 10/2008 | Lavigne |
| 2008/0279196 A1 | 11/2008 | Friskney |
| 2008/0285458 A1 | 11/2008 | Lysne |
| 2008/0285555 A1 | 11/2008 | Ogasahara |
| 2008/0288020 A1 | 11/2008 | Einav |
| 2008/0298248 A1 | 12/2008 | Roeck |
| 2008/0304498 A1 | 12/2008 | Jorgensen |
| 2008/0304519 A1 | 12/2008 | Koenen |
| 2008/0310342 A1 | 12/2008 | Kruys |
| 2009/0022069 A1 | 1/2009 | Khan |
| 2009/0024734 A1 | 1/2009 | Merbach |
| 2009/0037607 A1 | 2/2009 | Farinacci |
| 2009/0037977 A1 | 2/2009 | Gai |
| 2009/0041046 A1 | 2/2009 | Hirata |
| 2009/0044270 A1 | 2/2009 | Shelly |
| 2009/0052326 A1 | 2/2009 | Bergamasco |
| 2009/0067422 A1 | 3/2009 | Poppe |
| 2009/0067442 A1 | 3/2009 | Killian |
| 2009/0079560 A1 | 3/2009 | Fries |
| 2009/0080345 A1 | 3/2009 | Gray |
| 2009/0083445 A1 | 3/2009 | Ganga |
| 2009/0092042 A1 | 4/2009 | Yuhara |
| 2009/0092043 A1 | 4/2009 | Lapuh |
| 2009/0094354 A1 | 4/2009 | Rastogi |
| 2009/0106298 A1 | 4/2009 | Furusho |
| 2009/0106405 A1 | 4/2009 | Mazarick |
| 2009/0113408 A1 | 4/2009 | Toeroe |
| 2009/0116381 A1 | 5/2009 | Kanda |
| 2009/0122700 A1 | 5/2009 | Aboba |
| 2009/0129384 A1 | 5/2009 | Regan |
| 2009/0129389 A1 | 5/2009 | DeFretay |
| 2009/0138577 A1 | 5/2009 | Casado |
| 2009/0138752 A1 | 5/2009 | Graham |
| 2009/0144720 A1 | 6/2009 | Roush |
| 2009/0161584 A1 | 6/2009 | Guan |
| 2009/0161670 A1 | 6/2009 | Shepherd |
| 2009/0168647 A1 | 7/2009 | Holness |
| 2009/0199177 A1 | 8/2009 | Edwards |
| 2009/0204965 A1 | 8/2009 | Tanaka |
| 2009/0213783 A1 | 8/2009 | Moreton |
| 2009/0213867 A1 | 8/2009 | Devireddy |
| 2009/0222879 A1 | 9/2009 | Kostal |
| 2009/0225752 A1 | 9/2009 | Mitsumori |
| 2009/0232031 A1 | 9/2009 | Vasseur |
| 2009/0245112 A1 | 10/2009 | Okazaki |
| 2009/0245137 A1 | 10/2009 | Hares |
| 2009/0245242 A1 | 10/2009 | Carlson |
| 2009/0249444 A1 | 10/2009 | Macauley |
| 2009/0252049 A1 | 10/2009 | Ludwig |
| 2009/0252061 A1 | 10/2009 | Small |
| 2009/0252503 A1 | 10/2009 | Ishigami |
| 2009/0260083 A1 | 10/2009 | Szeto |
| 2009/0279558 A1 | 11/2009 | Davis |
| 2009/0279701 A1 | 11/2009 | Moisand |
| 2009/0292858 A1 | 11/2009 | Lambeth |
| 2009/0316721 A1 | 12/2009 | Kanda |
| 2009/0323698 A1 | 12/2009 | LeFaucheur |
| 2009/0323708 A1 | 12/2009 | Ihle |
| 2009/0327392 A1 | 12/2009 | Tripathi |
| 2009/0327462 A1 | 12/2009 | Adams |
| 2010/0002382 A1 | 1/2010 | Aybay |
| 2010/0027420 A1 | 2/2010 | Smith |
| 2010/0027429 A1 | 2/2010 | Jorgens |
| 2010/0042869 A1 | 2/2010 | Szabo |
| 2010/0046471 A1 | 2/2010 | Hattori |
| 2010/0054260 A1 | 3/2010 | Pandey |
| 2010/0061269 A1 | 3/2010 | Banerjee |
| 2010/0074175 A1 | 3/2010 | Banks |
| 2010/0085981 A1 | 4/2010 | Gupta |
| 2010/0097941 A1 | 4/2010 | Carlson |
| 2010/0103813 A1 | 4/2010 | Allan |
| 2010/0103939 A1 | 4/2010 | Carlson |
| 2010/0114818 A1 | 5/2010 | Lier |
| 2010/0131636 A1 | 5/2010 | Suri |
| 2010/0157844 A1 | 6/2010 | Casey |
| 2010/0158024 A1 | 6/2010 | Sajassi |
| 2010/0165877 A1 | 7/2010 | Shukla |
| 2010/0165995 A1 | 7/2010 | Mehta |
| 2010/0168467 A1 | 7/2010 | Johnston |
| 2010/0169467 A1 | 7/2010 | Shukla |
| 2010/0169948 A1 | 7/2010 | Budko |
| 2010/0182920 A1 | 7/2010 | Matsuoka |
| 2010/0189119 A1 | 7/2010 | Sawada |
| 2010/0192225 A1 | 7/2010 | Ma |
| 2010/0195489 A1 | 8/2010 | Zhou |
| 2010/0195529 A1 | 8/2010 | Liu |
| 2010/0214913 A1 | 8/2010 | Kompella |
| 2010/0215042 A1 | 8/2010 | Sato |
| 2010/0215049 A1 | 8/2010 | Raza |
| 2010/0220724 A1 | 9/2010 | Rabie |
| 2010/0226368 A1 | 9/2010 | Mack-Crane |
| 2010/0226381 A1 | 9/2010 | Mehta |
| 2010/0246388 A1 | 9/2010 | Gupta |
| 2010/0246580 A1 | 9/2010 | Kaganoi |
| 2010/0254703 A1 | 10/2010 | Kirkpatrick |
| 2010/0257263 A1 | 10/2010 | Casado |
| 2010/0258263 A1 | 10/2010 | Douxchamps |
| 2010/0265849 A1 | 10/2010 | Harel |
| 2010/0271960 A1 | 10/2010 | Krygowski |
| 2010/0272107 A1 | 10/2010 | Papp |
| 2010/0281106 A1 | 11/2010 | Ashwood-Smith |
| 2010/0284418 A1 | 11/2010 | Gray |
| 2010/0284698 A1 | 11/2010 | McColloch |
| 2010/0287262 A1 | 11/2010 | Elzur |
| 2010/0287548 A1 | 11/2010 | Zhou |
| 2010/0290464 A1 | 11/2010 | Assarpour |
| 2010/0290472 A1 | 11/2010 | Raman |
| 2010/0290473 A1 | 11/2010 | Enduri |
| 2010/0299527 A1 | 11/2010 | Arunan |
| 2010/0303071 A1 | 12/2010 | Kotalwar |
| 2010/0303075 A1 | 12/2010 | Tripathi |
| 2010/0303083 A1 | 12/2010 | Belanger |
| 2010/0309820 A1 | 12/2010 | Rajagopalan |
| 2010/0309912 A1 | 12/2010 | Mehta |
| 2010/0316055 A1 | 12/2010 | Belanger |
| 2010/0329110 A1 | 12/2010 | Rose |
| 2010/0329265 A1 | 12/2010 | Lapuh |
| 2011/0007738 A1 | 1/2011 | Berman |
| 2011/0019678 A1 | 1/2011 | Mehta |
| 2011/0032945 A1 | 2/2011 | Mullooly |
| 2011/0035489 A1 | 2/2011 | McDaniel |
| 2011/0035498 A1 | 2/2011 | Shah |
| 2011/0044339 A1 | 2/2011 | Kotalwar |
| 2011/0044352 A1 | 2/2011 | Chaitou |
| 2011/0051723 A1 | 3/2011 | Rabie |
| 2011/0058547 A1 | 3/2011 | Waldrop |
| 2011/0064086 A1 | 3/2011 | Xiong |
| 2011/0064089 A1 | 3/2011 | Hidaka |
| 2011/0072208 A1 | 3/2011 | Gulati |

(56) References Cited

U.S. PATENT DOCUMENTS

| | | |
|---|---|---|
| 2011/0085557 A1 | 4/2011 | Gnanasekaran |
| 2011/0085560 A1 | 4/2011 | Chawla |
| 2011/0085562 A1 | 4/2011 | Bao |
| 2011/0085563 A1 | 4/2011 | Kotha |
| 2011/0088011 A1 | 4/2011 | Ouali |
| 2011/0110266 A1 | 5/2011 | Li |
| 2011/0134802 A1 | 6/2011 | Rajagopalan |
| 2011/0134803 A1 | 6/2011 | Dalvi |
| 2011/0134924 A1 | 6/2011 | Hewson |
| 2011/0134925 A1 | 6/2011 | Safrai |
| 2011/0142053 A1 | 6/2011 | VanDerMerwe |
| 2011/0142062 A1 | 6/2011 | Wang |
| 2011/0149526 A1 | 6/2011 | Turner |
| 2011/0158113 A1 | 6/2011 | Nanda |
| 2011/0161494 A1 | 6/2011 | McDysan |
| 2011/0161695 A1 | 6/2011 | Okita |
| 2011/0170405 A1* | 7/2011 | Beecroft ............ H04L 49/557 370/217 |
| 2011/0176412 A1 | 7/2011 | Stine |
| 2011/0188373 A1 | 8/2011 | Saito |
| 2011/0194403 A1 | 8/2011 | Sajassi |
| 2011/0194563 A1 | 8/2011 | Shen |
| 2011/0225540 A1 | 9/2011 | d'Entremont |
| 2011/0228767 A1 | 9/2011 | Singla |
| 2011/0228780 A1 | 9/2011 | Ashwood-Smith |
| 2011/0231570 A1 | 9/2011 | Altekar |
| 2011/0231574 A1 | 9/2011 | Saunderson |
| 2011/0235523 A1 | 9/2011 | Jha |
| 2011/0243133 A9 | 10/2011 | Villait |
| 2011/0243136 A1 | 10/2011 | Raman |
| 2011/0246669 A1 | 10/2011 | Kanada |
| 2011/0255538 A1 | 10/2011 | Srinivasan |
| 2011/0255540 A1 | 10/2011 | Mizrahi |
| 2011/0261828 A1 | 10/2011 | Smith |
| 2011/0268118 A1 | 11/2011 | Schlansker |
| 2011/0268120 A1 | 11/2011 | Vobbilisetty |
| 2011/0268125 A1 | 11/2011 | Vobbilisetty |
| 2011/0273988 A1 | 11/2011 | Tourrilhes |
| 2011/0273990 A1 | 11/2011 | Rajagopalan |
| 2011/0274114 A1 | 11/2011 | Dhar |
| 2011/0280572 A1 | 11/2011 | Vobbilisetty |
| 2011/0286324 A1* | 11/2011 | Bellagamba ........ H04L 41/0677 370/219 |
| 2011/0286357 A1 | 11/2011 | Haris |
| 2011/0286457 A1 | 11/2011 | Ee |
| 2011/0286462 A1 | 11/2011 | Kompella |
| 2011/0055274 A1 | 12/2011 | Hegge |
| 2011/0292947 A1 | 12/2011 | Vobbilisetty |
| 2011/0296052 A1 | 12/2011 | Guo |
| 2011/0299391 A1 | 12/2011 | Vobbilisetty |
| 2011/0299413 A1 | 12/2011 | Chatwani |
| 2011/0299414 A1 | 12/2011 | Yu |
| 2011/0299527 A1 | 12/2011 | Yu |
| 2011/0299528 A1 | 12/2011 | Yu |
| 2011/0299531 A1 | 12/2011 | Yu |
| 2011/0299532 A1 | 12/2011 | Yu |
| 2011/0299533 A1 | 12/2011 | Yu |
| 2011/0299534 A1 | 12/2011 | Koganti |
| 2011/0299535 A1 | 12/2011 | Vobbilisetty |
| 2011/0299536 A1 | 12/2011 | Cheng |
| 2011/0317559 A1 | 12/2011 | Kern |
| 2011/0317703 A1 | 12/2011 | Dunbar et al. |
| 2012/0011240 A1 | 1/2012 | Hara |
| 2012/0014261 A1 | 1/2012 | Salam |
| 2012/0014387 A1 | 1/2012 | Dunbar |
| 2012/0020220 A1 | 1/2012 | Sugita |
| 2012/0027017 A1 | 2/2012 | Rai |
| 2012/0033663 A1 | 2/2012 | Guichard |
| 2012/0033665 A1 | 2/2012 | Jacob |
| 2012/0033668 A1 | 2/2012 | Humphries |
| 2012/0033669 A1 | 2/2012 | Mohandas |
| 2012/0033672 A1 | 2/2012 | Page |
| 2012/0039163 A1 | 2/2012 | Nakajima |
| 2012/0042095 A1 | 2/2012 | Kotha |
| 2012/0063363 A1 | 3/2012 | Li |
| 2012/0075991 A1 | 3/2012 | Sugita |
| 2012/0099567 A1 | 4/2012 | Hart |
| 2012/0099602 A1 | 4/2012 | Nagapudi |
| 2012/0099863 A1 | 4/2012 | Xu |
| 2012/0102160 A1 | 4/2012 | Breh |
| 2012/0106339 A1 | 5/2012 | Mishra |
| 2012/0117438 A1 | 5/2012 | Shaffer |
| 2012/0131097 A1 | 5/2012 | Baykal |
| 2012/0131289 A1 | 5/2012 | Taguchi |
| 2012/0134266 A1 | 5/2012 | Roitshtein |
| 2012/0136999 A1 | 5/2012 | Roitshtein |
| 2012/0147740 A1 | 6/2012 | Nakash |
| 2012/0158997 A1 | 6/2012 | Hsu |
| 2012/0163164 A1 | 6/2012 | Terry |
| 2012/0170491 A1 | 7/2012 | Kern |
| 2012/0177039 A1 | 7/2012 | Berman |
| 2012/0210416 A1 | 8/2012 | Mihelich |
| 2012/0221636 A1 | 8/2012 | Surtani |
| 2012/0230225 A1 | 9/2012 | Matthews |
| 2012/0239918 A1 | 9/2012 | Huang |
| 2012/0243359 A1 | 9/2012 | Keesara |
| 2012/0243539 A1 | 9/2012 | Keesara |
| 2012/0250502 A1 | 10/2012 | Brolin |
| 2012/0260079 A1 | 10/2012 | Mruthyunjaya |
| 2012/0275297 A1 | 11/2012 | Subramanian |
| 2012/0275347 A1 | 11/2012 | Banerjee |
| 2012/0278804 A1 | 11/2012 | Narayanasamy |
| 2012/0281700 A1 | 11/2012 | Koganti |
| 2012/0287785 A1 | 11/2012 | Kamble |
| 2012/0294192 A1 | 11/2012 | Masood |
| 2012/0294194 A1 | 11/2012 | Balasubramanian |
| 2012/0230800 A1 | 12/2012 | Kamble |
| 2012/0320800 A1 | 12/2012 | Kamble |
| 2012/0320926 A1 | 12/2012 | Kamath et al. |
| 2012/0327766 A1 | 12/2012 | Tsai et al. |
| 2012/0327937 A1 | 12/2012 | Melman et al. |
| 2013/0003535 A1 | 1/2013 | Sarwar |
| 2013/0003549 A1 | 1/2013 | Matthews |
| 2013/0003608 A1 | 1/2013 | Lei |
| 2013/0003737 A1 | 1/2013 | Sinicrope |
| 2013/0003738 A1 | 1/2013 | Koganti |
| 2013/0003747 A1 | 1/2013 | Raman |
| 2013/0016606 A1 | 1/2013 | Cirkovic |
| 2013/0028072 A1 | 1/2013 | Addanki |
| 2013/0034015 A1 | 2/2013 | Jaiswal |
| 2013/0034021 A1 | 2/2013 | Jaiswal |
| 2013/0034094 A1 | 2/2013 | Cardona |
| 2013/0044629 A1 | 2/2013 | Biswas |
| 2013/0058354 A1 | 3/2013 | Casado |
| 2013/0066947 A1 | 3/2013 | Ahmad |
| 2013/0067466 A1 | 3/2013 | Combs |
| 2013/0070762 A1 | 3/2013 | Adams |
| 2013/0083693 A1 | 4/2013 | Himura |
| 2013/0097345 A1 | 4/2013 | Munoz |
| 2013/0114595 A1 | 5/2013 | Mack-Crane et al. |
| 2013/0121142 A1 | 5/2013 | Bai |
| 2013/0124707 A1 | 5/2013 | Ananthapadmanabha |
| 2013/0124750 A1 | 5/2013 | Anumala |
| 2013/0127848 A1 | 5/2013 | Joshi |
| 2013/0132296 A1 | 5/2013 | Koppenhagen |
| 2013/0135811 A1 | 5/2013 | Dunwoody |
| 2013/0136123 A1 | 5/2013 | Ge |
| 2013/0145008 A1 | 6/2013 | Kannan |
| 2013/0148546 A1 | 6/2013 | Eisenhauer |
| 2013/0148663 A1 | 6/2013 | Xiong |
| 2013/0156425 A1 | 6/2013 | Kirkpatrick |
| 2013/0163591 A1 | 6/2013 | Shukla |
| 2013/0194914 A1 | 8/2013 | Agarwal |
| 2013/0201992 A1 | 8/2013 | Masaki |
| 2013/0215754 A1 | 8/2013 | Tripathi |
| 2013/0219473 A1 | 8/2013 | Schaefer |
| 2013/0223221 A1 | 8/2013 | Xu |
| 2013/0223438 A1 | 8/2013 | Tripathi |
| 2013/0223449 A1 | 8/2013 | Koganti |
| 2013/0238802 A1 | 9/2013 | Sarikaya |
| 2013/0250947 A1 | 9/2013 | Zheng |
| 2013/0250951 A1 | 9/2013 | Koganti |
| 2013/0250958 A1 | 9/2013 | Watanabe |
| 2013/0259037 A1 | 10/2013 | Natarajan |

(56) References Cited

U.S. PATENT DOCUMENTS

| | | |
|---|---|---|
| 2013/0266015 A1 | 10/2013 | Qu |
| 2013/0268590 A1 | 10/2013 | Mahadevan |
| 2013/0272135 A1 | 10/2013 | Leong |
| 2013/0294451 A1 | 11/2013 | Li |
| 2013/0297757 A1 | 11/2013 | Han |
| 2013/0301425 A1 | 11/2013 | Udutha |
| 2013/0301642 A1 | 11/2013 | Radhakrishnan |
| 2013/0308492 A1 | 11/2013 | Baphna |
| 2013/0308641 A1 | 11/2013 | Ackley |
| 2013/0308647 A1 | 11/2013 | Rosset |
| 2013/0315125 A1 | 11/2013 | Ravishankar |
| 2013/0315246 A1 | 11/2013 | Zhang |
| 2013/0315586 A1 | 11/2013 | Kipp |
| 2013/0322427 A1 | 12/2013 | Stiekes |
| 2013/0329605 A1 | 12/2013 | Nakil |
| 2013/0332660 A1 | 12/2013 | Talagala |
| 2013/0336104 A1 | 12/2013 | Talla |
| 2013/0346583 A1 | 12/2013 | Low |
| 2014/0010239 A1 | 1/2014 | Xu |
| 2014/0013324 A1 | 1/2014 | Zhang |
| 2014/0019608 A1 | 1/2014 | Kawakami |
| 2014/0019639 A1 | 1/2014 | Ueno |
| 2014/0025736 A1 | 1/2014 | Wang |
| 2014/0029412 A1 | 1/2014 | Janardhanan |
| 2014/0029419 A1 | 1/2014 | Jain |
| 2014/0044126 A1 | 2/2014 | Sabhanatarajan |
| 2014/0050223 A1 | 2/2014 | Foo |
| 2014/0056298 A1 | 2/2014 | Vobbilisetty |
| 2014/0059225 A1 | 2/2014 | Gasparakis |
| 2014/0064056 A1 | 3/2014 | Sakata |
| 2014/0071987 A1 | 3/2014 | Janardhanan |
| 2014/0086253 A1 | 3/2014 | Yong |
| 2014/0092738 A1 | 4/2014 | Grandhi |
| 2014/0105034 A1 | 4/2014 | Sun |
| 2014/0112122 A1 | 4/2014 | Kapadia |
| 2014/0140243 A1 | 5/2014 | Ashwood-Smith |
| 2014/0157251 A1 | 6/2014 | Hocker |
| 2014/0169368 A1 | 6/2014 | Grover |
| 2014/0188996 A1 | 7/2014 | Lie |
| 2014/0192804 A1 | 7/2014 | Ghanwani |
| 2014/0195695 A1 | 7/2014 | Okita |
| 2014/0241147 A1 | 8/2014 | Rajagopalan |
| 2014/0258446 A1 | 9/2014 | Bursell |
| 2014/0269701 A1 | 9/2014 | Kaushik |
| 2014/0269709 A1 | 9/2014 | Benny |
| 2014/0269720 A1 | 9/2014 | Srinivasan |
| 2014/0269733 A1 | 9/2014 | Venkatesh |
| 2014/0298091 A1 | 10/2014 | Carlen |
| 2014/0348168 A1 | 11/2014 | Singh |
| 2014/0355477 A1 | 12/2014 | Velayudhan |
| 2014/0362854 A1 | 12/2014 | Addanki |
| 2014/0362859 A1 | 12/2014 | Addanki |
| 2014/0376550 A1 | 12/2014 | Khan |
| 2015/0009992 A1 | 1/2015 | Zhang |
| 2015/0010007 A1 | 1/2015 | Matsuhira |
| 2015/0016300 A1 | 1/2015 | Devireddy |
| 2015/0030031 A1 | 1/2015 | Zhou |
| 2015/0092593 A1 | 4/2015 | Kompella |
| 2015/0103826 A1 | 4/2015 | Davis |
| 2015/0110111 A1 | 4/2015 | Song |
| 2015/0110487 A1 | 4/2015 | Fenkes |
| 2015/0117256 A1 | 4/2015 | Sabaa |
| 2015/0117454 A1 | 4/2015 | Koponen |
| 2015/0127618 A1 | 5/2015 | Alberti |
| 2015/0139234 A1 | 5/2015 | Hu |
| 2015/0143369 A1 | 5/2015 | Zheng |
| 2015/0172098 A1 | 6/2015 | Agarwal |
| 2015/0188753 A1 | 7/2015 | Anumala |
| 2015/0188770 A1 | 7/2015 | Naiksatam |
| 2015/0195093 A1 | 7/2015 | Mahadevan |
| 2015/0222506 A1 | 8/2015 | Kizhakkiniyil |
| 2015/0248298 A1 | 9/2015 | Gavrilov |
| 2015/0263897 A1 | 9/2015 | Ganichev |
| 2015/0263899 A1 | 9/2015 | Tubaltsev |
| 2015/0263991 A1 | 9/2015 | MacChiano |
| 2015/0281066 A1 | 10/2015 | Koley |
| 2015/0301901 A1 | 10/2015 | Rath |
| 2015/0347468 A1 | 12/2015 | Bester |
| 2016/0072899 A1 | 3/2016 | Tung |
| 2016/0087885 A1 | 3/2016 | Tripathi |
| 2016/0139939 A1 | 5/2016 | Bosch |
| 2016/0182458 A1 | 6/2016 | Shatzkamer |
| 2016/0212040 A1 | 7/2016 | Bhagavathiperumal |
| 2016/0344640 A1 | 11/2016 | Soderlund et al. |
| 2017/0012880 A1 | 1/2017 | Yang |
| 2017/0026197 A1 | 1/2017 | Venkatesh |
| 2017/0097841 A1 | 4/2017 | Chang |
| 2018/0013614 A1 | 1/2018 | Vobbilisetty |

FOREIGN PATENT DOCUMENTS

| | | |
|---|---|---|
| CN | 101064682 | 10/2007 |
| CN | 101459618 | 6/2009 |
| CN | 101471899 | 7/2009 |
| CN | 101548511 | 9/2009 |
| CN | 101645880 | 2/2010 |
| CN | 102098237 | 6/2011 |
| CN | 102148749 | 8/2011 |
| CN | 102301663 | 12/2011 |
| CN | 102349268 | 2/2012 |
| CN | 102378176 | 3/2012 |
| CN | 102404181 | 4/2012 |
| CN | 102415065 | 4/2012 |
| CN | 102415065 A | 4/2012 |
| CN | 102801599 | 11/2012 |
| CN | 102801599 A | 11/2012 |
| CN | 102088388 | 4/2014 |
| EP | 0579567 | 5/1993 |
| EP | 0579567 A2 | 1/1994 |
| EP | 0993156 | 4/2000 |
| EP | 0993156 A2 | 12/2000 |
| EP | 1398920 | 3/2004 |
| EP | 1398920 A2 | 3/2004 |
| EP | 1916807 A2 | 4/2008 |
| EP | 2001167 A1 | 10/2008 |
| EP | 2854352 | 4/2015 |
| EP | 2874359 | 5/2015 |
| WO | 2008056838 | 5/2008 |
| WO | 2009042919 | 4/2009 |
| WO | 2010111142 | 9/2010 |
| WO | 2010111142 A1 | 9/2010 |
| WO | 2011132568 | 10/2011 |
| WO | 2011140028 | 11/2011 |
| WO | 2011140028 A1 | 11/2011 |
| WO | 2012033663 | 3/2012 |
| WO | 2012093429 | 7/2012 |
| WO | 2014031781 | 2/2014 |

OTHER PUBLICATIONS

Perlman, Radia et al., 'RBridge VLAN Mapping', TRILL Working Group, Dec. 4, 2009, pp. 1-12.

Touch, J. et al., 'Transparent Interconnection of Lots of Links (TRILL): Problem and Applicability Statement', May 2009, Network Working Group, pp. 1-17.

'Switched Virtual Networks.' Internetworking Moves Beyond Bridges and Routers' Data Communications, McGraw Hill. New York, US, vol. 23, No. 12, Sep. 1, 1994 (Sep. 1, 1994), pp. 66-70,72,74, XP000462385 ISSN: 0363-6399.

Knight S et al: 'Virtual Router Redundancy Protocol' Internet Citation Apr. 1, 1998 (Apr. 1, 1998), XP002135272 Retrieved from the Internet: URL:ftp://ftp.isi.edu/in-notes/rfc2338.txt [retrieved on Apr. 10, 2000].

Office Action dated Jun. 18, 215, U.S. Appl. No. 13/098,490, filed May 2, 2011.

Perlman R: 'Challenges and opportunities in the design of TRILL: a routed layer 2 technology', 2009 IEEE Globecom Workshops, Honolulu, HI, USA, Piscataway, NJ, USA, Nov. 30, 2009 (Nov. 30, 2009), pp. 1-6, XP002649647, DOI: 10.1109/Globecom.2009. 5360776 ISBN: 1-4244-5626-0 [retrieved on Jul. 19, 2011].

TRILL Working Group Internet-Draft Intended status: Proposed Standard RBridges: Base Protocol Specificaiton Mar. 3, 2010.

(56) References Cited

OTHER PUBLICATIONS

Office Action dated Jun. 16, 2015, U.S. Appl. No. 13/048,817, filed Mar. 15, 2011.
Knight P et al: 'Layer 2 and 3 Virtual Private Networks: Taxonomy, Technology, and Standardization Efforts', IEEE Communications Magazine, IEEE Service Center, Piscataway, US, vol. 42, No. 6, Jun. 1, 2004 (Jun. 1, 2004), pp. 124-131, XP001198207, ISSN: 0163-6804, DOI: 10.1109/MCOM.2004.1304248.
Office Action for U.S. Appl. No. 13/092,873, filed Apr. 22, 2011, dated Nov. 29, 2013.
Perlman, Radia et al., 'RBridges: Base Protocol Specification; Draft-ietf-trill-rbridge-protocol-16.txt', Mar. 3, 2010, pp. 1-117.
'An Introduction to Brocade VCS Fabric Technology', Brocade white paper, http://community.brocade.com/docs/DOC-2954, Dec. 3, 2012.
'RBridges: Base Protocol Specification', IETF Draft, Perlman et al., Jun. 26, 2009.
Abawajy J. "An Approach to Support a Single Service Provider Address Image for Wide Area Networks Environment" Centre for Parallel and Distributed Computing, School of Computer Science Carleton University, Ottawa, Ontario, K1S 5B6, Canada.
U.S. Appl. No. 13/030,806 Office Action dated Dec. 3, 2012.
Office action dated Apr. 26, 2012, U.S. Appl. No. 12/725,249, filed Mar. 16, 2010.
Office action dated Sep. 12, 2012, U.S. Appl. No. 12/725,249, filed Mar. 16, 2010.
Office action dated Dec. 21, 2012, U.S. Appl. No. 13/098,490, filed May 2, 2011.
Office action dated Mar. 27, 2014, U.S. Appl. No. 13/098,490, filed May 2, 2011.
Office action dated Jul. 9, 2013, U.S. Appl. No. 13/098,490, filed May 2, 2011.
Office action dated Jun. 8, 2015, U.S. Appl. No. 14/178,042, filed Feb. 11, 2014.
Office action dated May 22, 2013, U.S. Appl. No. 13/087,239, filed Apr. 14, 2011.
Office action dated Dec. 5, 2012, U.S. Appl. No. 13/087,239, filed Apr. 14, 2011.
Office action dated Apr. 9, 2014, U.S. Appl. No. 13/092,724, filed Apr. 22, 2011.
Office action dated Feb. 5, 2013, U.S. Appl. No. 13/092,724, filed Apr. 22, 2011.
Office action dated Jan. 10, 2014, U.S. Appl. No. 13/092,580, filed Apr. 22, 2011.
Office action dated Jun. 10, 2013, U.S. Appl. No. 13/092,580, filed Apr. 22, 2011.
Office action dated Jan. 16, 2014, U.S. Appl. No. 13/042,259, filed Mar. 7, 2011.
Office action dated Mar. 18, 2013, U.S. Appl. No. 13/042,259, filed Mar. 7, 2011.
Office action dated Jul. 31, 2013, U.S. Appl. No. 13/042,259, filed Mar. 7, 2011.
Office action dated Aug. 29, 2014, U.S. Appl. No. 13/042,259, filed Mar. 7, 2011.
Office action dated Mar. 14, 2014, U.S. Appl. No. 13/092,460, filed Apr. 22, 2011.
Office action dated Jun. 21, 2013, U.S. Appl. No. 13/092,460, filed Apr. 22, 2011.
Office action dated Aug. 14, 2014, U.S. Appl. No. 13/092,460, filed Apr. 22, 2011.
Office action dated Jan. 28, 2013, U.S. Appl. No. 13/092,701, filed Apr. 22, 2011.
Office Action dated Mar. 26, 2014, U.S. Appl. No. 13/092,701, filed Apr. 22, 2011.
Office action dated Jul. 3, 2013, U.S. Appl. No. 13/092,701, filed Apr. 22, 2011.
Office action dated Oct. 2, 2014, for U.S. Appl. No. 13/092,752, filed Apr. 22, 2011.
Office Action dated Apr. 9, 2014, U.S. Appl. No. 13/092,752, filed Apr. 22, 2011.
Office action dated Jul. 18, 2013, U.S. Appl. No. 13/092,752, filed Apr. 22, 2011.
Office action dated Dec. 20, 2012, U.S. Appl. No. 12/950,974, filed Nov. 19, 2010.
Office action dated May 24, 2012, U.S. Appl. No. 12/950,974, filed Nov. 19, 2010.
Office action dated Jan. 6, 2014, U.S. Appl. No. 13/092,877, filed Apr. 22, 2011.
Office action dated Sep. 5, 2013, U.S. Appl. No. 13/092,877, filed Apr. 22, 2011.
Office action dated Mar. 4, 2013, U.S. Appl. No. 13/092,877, filed Apr. 22, 2011.
Office action dated Jan. 4, 2013, U.S. Appl. No. 12/950,968, filed Nov. 19, 2010.
Office action dated Jun. 7, 2012, U.S. Appl. No. 12/950,968, filed Nov. 19, 2010.
Office action dated Sep. 19, 2012, U.S. Appl. No. 13/092,864, filed Apr. 22, 2011.
Office action dated May 31, 2013, U.S. Appl. No. 13/098,360, filed Apr. 29, 2011.
Office action dated Jul. 7, 2014, for U.S. Appl. No. 13/044,326, filed Mar. 9, 2011.
Office action dated Oct. 2, 2013, U.S. Appl. No. 13/044,326, filed Mar. 9, 2011.
Office Action dated Dec. 19, 2014, for U.S. Appl. No. 13/044,326, filed Mar. 9, 2011.
Office action dated Dec. 3, 2012, U.S. Appl. No. 13/030,806, filed Feb. 18, 2011.
Office action dated Apr. 22, 2014, U.S. Appl. No. 13/030,806, filed Feb. 18, 2011.
Office action dated Jun. 11, 2013, U.S. Appl. No. 13/030,806, filed Feb. 18, 2011.
Office action dated Apr. 25, 2013, U.S. Appl. No. 13/030,688, filed Feb. 18, 2011.
Office action dated Feb. 22, 2013, U.S. Appl. No. 13/044,301, filed Mar. 9, 2011.
Office action dated Jun. 11, 2013, U.S. Appl. No. 13/044,301, filed Mar. 9, 2011.
Office action dated Oct. 26, 2012, U.S. Appl. No. 13/050,102, filed Mar. 17, 2011.
Office action dated May 16, 2013, U.S. Appl. No. 13/050,102, filed Mar. 17, 2011.
Office action dated Aug. 4, 2014, U.S. Appl. No. 13/050,102, filed Mar. 17, 2011.
Office action dated Jan. 28, 2013, U.S. Appl. No. 13/148,526, filed Jul. 16, 2011.
Office action dated Dec. 2, 2013, U.S. Appl. No. 13/184,526, filed Jul. 16, 2011.
Office action dated May 22, 2013, U.S. Appl. No. 13/148,526, filed Jul. 16, 2011.
Office action dated Aug. 21, 2014, U.S. Appl. No. 13/184,526, filed Jul. 16, 2011.
Office action dated Nov. 29, 2013, U.S. Appl. No. 13/092,873, filed Apr. 22, 2011.
Office action dated Jun. 19, 2013, U.S. Appl. No. 13/092,873, filed Apr. 22, 2011.
Office Action dated May 21, 2015, U.S. Appl. No. 13/288,822, filed Nov. 3, 2011.
Office action dated Jul. 18, 2013, U.S. Appl. No. 13/365,808, filed Feb. 3, 2012.
Office Action dated Mar. 6, 2014, U.S. Appl. No. 13/425,238, filed Mar. 20, 2012.
Office action dated Nov. 12, 2013, U.S. Appl. No. 13/312,903, filed Dec. 6, 2011.
Office action dated Jun. 13, 2013, U.S. Appl. No. 13/312,903, filed Dec. 6, 2011.
Office Action dated Jun. 18, 2014, U.S. Appl. No. 13/440,861, filed Apr. 5, 2012.
Office action dated Apr. 30, 2015, U.S. Appl. No. 13/351,513, filed Jan. 17, 2012.
Office Action dated Feb. 28, 2014, U.S. Appl. No. 13/351,513, filed Jan. 17, 2012.

(56) References Cited

OTHER PUBLICATIONS

Office Action dated May 9, 2014, U.S. Appl. No. 13/484,072, filed May 30, 2012.
Office Action dated May 14, 2014, U.S. Appl. No. 13/533,843, filed Jun. 26, 2012.
Office Action dated Feb. 20, 2014, U.S. Appl. No. 13/598,204, filed Aug. 29, 2012.
Office Action dated Apr. 1, 2015 U.S. Appl. No. 13/656,438 filed Oct. 19, 2012.
Office Action dated Jun. 6, 2014, U.S. Appl. No. 13/669,357, filed Nov. 5, 2012.
Office Action dated Jun. 10, 2015, U.S. Appl. No. 13/890,150, filed May 8, 2013.
Brocade, 'Brocade Fabrics OS (FOS) 6.2 Virtual Fabrics Feature Frequently Asked Questions', pp. 1-6, 2009 Brocade Communications Systems, Inc.
Brocade, 'FastIron and TurboIron 24x Configuration Guide', Feb. 16, 2010.
Brocade, 'The Effortless Network: Hyperedge Technology for the Campus LAN' 2012.
Brocade 'An Introduction to Brocade VCS Fabric Technology', Dec. 3, 2012.
Brocade 'Brocade Unveils' The Effortless Network, http://newsroom.brocade.com/press-releases/brocade-unveils-the-effortless-network-nasdaq-brcd-0859535, 2012.
Christensen, M. et al., 'Considerations for Internet Group Management Protocol (IGMP) and Multicast Listener Discovery (MLD) Snooping Switches', May 2006.
FastIron Configuration Guide Supporting Ironware Software Release 07.0.00, Dec. 18, 2009.
Foundary FastIron Configuration Guide, Software Release FSX 04.2.00b, Software Release FWS 04.3.00, Software Release FGS 05.0.00a, Sep. 2008.
Huang, Nen-Fu et al., 'An Effective Spanning Tree Algorithm for a Bridged LAN', Mar. 16, 1992.
Knight, 'Network Based IP VPN Architecture using Virtual Routers', May 2003.
Kompella, Ed K. et al., 'Virtual Private LAN Service (VPLS) Using BGP for Auto-Discovery and Signaling' Jan. 2007.
Kreeger, L. et al., 'Network Virtualization Overlay Control Protocol Requirements draft-kreeger-nvo3-overlay-cp-00', Jan. 30, 2012.
Lapuh, Roger et al., 'Split Multi-link Trunking (SMLT)', draft-lapuh-network-smlt-08, Jul. 2008.
Lapuh, Roger et al., 'Split Multi-Link Trunking (SMLT)', Network Working Group, Oct. 2012.
Lapuh, Roger et al., 'Split Multi-link Trunking (SMLT) draft-lapuh-network-smlt-08', Jan. 2009.
Louati, Wajdi et al., 'Network-based virtual personal overlay networks using programmable virtual routers', IEEE Communications Magazine, Jul. 2005.
Mahalingam "VXLAN: A Framework for Overlaying Virtualized Layer 2 Networks over Layer 3 Networks" Oct. 17, 2013 pp. 1-22, Sections 1, 4 and 4.1.
Mckeown, Nick et al. "OpenFlow: Enabling Innovation in Campus Networks", Mar. 14, 2008, www.openflow.org/documents/openflow-wp-latest.pdf.
Narten, T. et al., 'Problem Statement: Overlays for Network Virtualization d raft-na rten-n vo3-over l ay-problem -statement-01', Oct. 31, 2011.
Office Action for U.S. Appl. No. 13/030,688, filed Feb. 18, 2011, dated Jul. 17, 2014.
Office Action for U.S. Appl. No. 13/042,259, filed Mar. 7, 2011, from Jaroenchonwanit, Bunjob, dated Jan. 16, 2014.
Office Action for U.S. Appl. No. 13/044,326, filed Mar. 9, 2011, dated Jul. 7, 2014.
Office Action for U.S. Appl. No. 13/092,752, filed Apr. 22, 2011, dated Apr. 9, 2014.
Office Action for U.S. Appl. No. 13/092,752, filed Apr. 22, 2011, from Park, Jung H., dated Jul. 18, 2013.
Office Action for U.S. Appl. No. 13/092,873, filed Apr. 22, 2011, dated Jul. 25, 2014.
Office Action for U.S. Appl. No. 13/092,877, filed Apr. 22, 2011, dated Jun. 20, 2014.
Office Action for U.S. Appl. No. 13/312,903, filed Dec. 6, 2011, dated Aug. 7, 2014.
Office Action for U.S. Appl. No. 13/351,513, filed Jan. 17, 2012, dated Jul. 24, 2014.
Office Action for U.S. Appl. No. 13/365,993, filed Feb. 3, 2012, from Cho, Hong Sol., dated Jul. 23, 2013.
Office Action for U.S. Appl. No. 13/425,238, filed Mar. 20, 2012, dated Mar. 6, 2014.
Office Action for U.S. Appl. No. 13/556,061, filed Jul. 23, 2012, dated Jun. 6, 2014.
Office Action for U.S. Appl. No. 13/742,207 dated Jul. 24, 2014, filed Jan. 15, 2013.
Office Action for U.S. Appl. No. 13/950,974, filed Nov. 19, 2010, from Haile, Awet A., dated Dec. 2, 2012.
Office Action for U.S. Appl. No. 12/725,249, filed Mar. 16, 2010, dated Apr. 26, 2013.
Office Action for U.S. Appl. No. 12/725,249, filed Mar. 16, 2010, dated Sep. 12, 2012.
Office Action for U.S. Appl. No. 12/950,968, filed Nov. 19, 2010, dated Jan. 4, 2013.
Office Action for U.S. Appl. No. 12/950,968, filed Nov. 19, 2010, dated Jun. 7, 2012.
Office Action for U.S. Appl. No. 12/950,974, filed Nov. 19, 2010, dated Dec. 20, 2012.
Office Action for U.S. Appl. No. 12/950,974, filed Nov. 19, 2010, dated May 24, 2012.
Office Action for U.S. Appl. No. 13/030,688, filed Feb. 18, 2011, dated Apr. 25, 2013.
Office Action for U.S. Appl. No. 13/030,806, filed Feb. 18, 2011, dated Dec. 3, 2012.
Office Action for U.S. Appl. No. 13/030,806, filed Feb. 18, 2011, dated Jun. 11, 2013.
Office Action for U.S. Appl. No. 13/042,259, filed Mar. 7, 2011, dated Feb. 23, 2015.
Office Action for U.S. Appl. No. 13/042,259, filed Mar. 7, 2011, dated Mar. 18, 2013.
Office Action for U.S. Appl. No. 13/042,259, filed Mar. 7, 2011, dated Jul. 31, 2013.
Office Action for U.S. Appl. No. 13/044,301, filed Mar. 9, 2011, dated Feb. 22, 2013.
Office Action for U.S. Appl. No. 13/044,301, filed Mar. 9, 2011, dated Jun. 11, 2013.
Office Action for U.S. Appl. No. 13/044,326, filed Mar. 9, 2011, dated Oct. 2, 2013.
Office Action for U.S. Appl. No. 13/050,102, filed Mar. 17, 2011, dated Oct. 26, 2012.
Office Action for U.S. Appl. No. 13/050,102, filed Mar. 17, 2011, dated May 16, 2013.
Office Action for U.S. Appl. No. 13/087,239, filed Apr. 14, 2011, dated May 22, 2013.
Office Action for U.S. Appl. No. 13/092,460, filed Apr. 22, 2011, dated Jun. 21, 2013.
Office Action for U.S. Appl. No. 13/092,580, filed Apr. 22, 2011, dated Jun. 10, 2013.
Office Action for U.S. Appl. No. 13/092,701, filed Apr. 22, 2011, dated Jan. 28, 2013.
Office Action for U.S. Appl. No. 13/092,701, filed Apr. 22, 2011, dated Jul. 3, 2013.
Office Action for U.S. Appl. No. 13/092,724, filed Apr. 22, 2011, dated Feb. 5, 2013.
Office Action for U.S. Appl. No. 13/092,724, filed Apr. 22, 2011, dated Jul. 16, 2013.
Office Action for U.S. Appl. No. 13/092,752, filed Apr. 22, 2011, dated Feb. 5, 2013.
Office Action for U.S. Appl. No. 13/092,864, filed Apr. 22, 2011, dated Sep. 19, 2012.
Office Action for U.S. Appl. No. 13/092,873, filed Apr. 22, 2011, dated Jun. 19, 2013.

(56) References Cited

OTHER PUBLICATIONS

Office Action for U.S. Appl. No. 13/092,877, filed Apr. 22, 2011, dated Mar. 4, 2013.
Office Action for U.S. Appl. No. 13/092,877, filed Apr. 22, 2011, dated Sep. 5, 2013.
Office Action for U.S. Appl. No. 13/098,360, filed Apr. 29, 2011, dated May 31, 2013.
Office Action for U.S. Appl. No. 13/098,490, filed May 2, 2011, dated Dec. 21, 2012.
Office Action for U.S. Appl. No. 13/098,490, filed May 2, 2011, dated Mar. 27, 2014.
Office Action for U.S. Appl. No. 13/098,490, filed May 2, 2011, dated Jul. 9, 2013.
Office Action for U.S. Appl. No. 13/184,526, filed Jul. 16, 2011, dated Jan. 28, 2013.
Office Action for U.S. Appl. No. 13/184,526, filed Jul. 16, 2011, dated May 22, 2013.
Office Action for U.S. Appl. No. 13/312,903, filed Dec. 6, 2011, dated Jun. 13, 2013.
Office Action for U.S. Appl. No. 13/044,301, filed Mar. 9, 2011, dated Jan. 29, 2015.
Office Action for U.S. Appl. No. 13/044,301, dated Mar. 9, 2011.
Office Action for U.S. Appl. No. 13/050,102, filed Mar. 17, 2011, dated Jan. 26, 2015.
Office Action for U.S. Appl. No. 13/087,239, filed Apr. 14, 2011, dated Dec. 5, 2012.
Office Action for U.S. Appl. No. 13/092,460, filed Apr. 22, 2011, dated Mar. 13, 2015.
Office Action for U.S. Appl. No. 13/092,752, filed Apr. 22, 2011, dated Feb. 27, 2015.
Office Action for U.S. Appl. No. 13/092,873, filed Apr. 22, 2011, dated Nov. 7, 2014.
Office Action for U.S. Appl. No. 13/092,877, filed Apr. 22, 2011, dated Nov. 10, 2014.
Office Action for U.S. Appl. No. 13/157,942, filed Jun. 10, 2011.
Office Action for U.S. Appl. No. 13/184,526, filed Jul. 16, 2011, dated Jan. 5, 2015.
Office Action for U.S. Appl. No. 13/184,526, filed Jul. 16, 2011, dated Dec. 2, 2013.
Office Action for U.S. Appl. No. 13/351,513, filed Jan. 17, 2012, dated Feb. 28, 2014.
Office Action for U.S. Appl. No. 13/365,808, filed Jul. 18, 2013, dated Jul. 18, 2013.
Office Action for U.S. Appl. No. 13/425,238, filed Mar. 20, 2012, dated Mar. 12, 2015.
Office Action for U.S. Appl. No. 13/533,843, filed Jun. 26, 2012, dated Oct. 21, 2013.
Office Action for U.S. Appl. No. 13/598,204, filed Aug. 29, 2012, dated Jan. 5, 2015.
Office Action for U.S. Appl. No. 13/598,204, filed Aug. 29, 2012, dated Feb. 20, 2014.
Office Action for U.S. Appl. No. 13/669,357, filed Nov. 5, 2012, dated Jan. 30, 2015.
Office Action for U.S. Appl. No. 13/786,328, filed Mar. 5, 2013, dated Mar. 13, 2015.
Office Action for U.S. Appl. No. 13/851,026, filed Mar. 26, 2013, dated Jan. 30, 2015.
Office Action for U.S. Appl. No. 14/577,785, filed Dec. 19, 2014, dated Apr. 13, 2015.
Office Action for U.S. Appl. No. 13/092,887, dated Jan. 6, 2014.
Perlman, Radia et al., 'Challenges and Opportunities in the Design of TRILL: a Routed layer 2 Technology', 2009.
Rosen, E. et al., "BGP/MPLS VPNs", Mar. 1999.
S. Nadas et al., 'Virtual Router Redundancy Protocol (VRRP) Version 3 for IPv4 and IPv6', Internet Engineering Task Force, Mar. 2010.
Siamak Azodolmolky et al. "Cloud computing networking: Challenges and opportunities for innovations", IEEE Communications Magazine, vol. 51, No. 7, Jul. 1, 2013.
Zhai F. Hu et al. 'RBridge: Pseudo-Nickname; draft-hu-trill-pseudonode-nickname-02.txt', May 15, 2012.
Office Action dated Jul. 31, 2015, U.S. Appl. No. 13/598,204, filed Aug. 29, 2014.
Office Action dated Jul. 31, 2015, U.S. Appl. No. 14/473,941, filed Aug. 29, 2014
Office Action dated Jul. 31, 2015, U.S. Appl. No. 14/488,173, filed Sep. 16, 2014.
Office Action dated Aug. 21, 2015, U.S. Appl. No. 13/776,217, filed Feb. 25, 2013.
Office Action dated Aug. 19, 2015, U.S. Appl. No. 14/156,374, filed Jan. 15, 2014.
Office Action dated Sep. 2, 2015, U.S. Appl. No. 14/151,693, filed Jan. 9, 2014.
Office Action dated Sep. 17, 2015, U.S. Appl. No. 14/577,785, filed Dec. 19, 2014.
Office Action dated Sep. 22, 2015 U.S. Appl. No. 13/656,438, filed Oct. 19, 2012.
Office Action dated Nov. 5, 2015, U.S. Appl. No. 14/178,042, filed Feb. 11, 2014.
Office Action dated Oct. 19, 2015, U.S. Appl. No. 14/215,996, filed Mar. 17, 2014.
Office Action dated Sep. 18, 2015, U.S. Appl. No. 13/345,566, filed Jan. 6, 2012.
Open Flow Switch Specification Version 1.1.0, Feb. 28, 2011.
Open Flow Switch Specification Version 1.0.0, Dec. 31, 2009.
Open Flow Configuration and Management Protocol 1.0 (OF-Config 1.0) Dec. 23, 2011.
Open Flow Switch Specification Version 1.2 Dec. 5, 2011.
Office action dated Feb. 2, 2016, U.S. Appl. No. 13/092,460, filed Apr. 22, 2011.
Office Action dated Feb. 2, 2016. U.S. Appl. No. 14/154,106, filed Jan. 13, 2014.
Office Action dated Feb. 3, 2016, U.S. Appl. No. 13/098,490, filed May 2, 2011.
Office Action dated Feb. 4, 2016, U.S. Appl. No. 13/557,105, filed Jul. 24, 2012.
Office Action dated Feb. 11, 2016, U.S. Appl. No. 14/488,173, filed Sep. 16, 2014.
Office Action dated Feb. 24, 2016, U.S. Appl. No. 13/971,397, filed Aug. 20, 2013.
Office Action dated Feb. 24, 2016, U.S. Appl. No. 12/705,508, filed Feb. 12, 2010.
Office Action dated Jul. 6, 2016, U.S. Appl. No. 14/618,941, filed Feb. 10, 2015.
Office Action dated Jul. 20, 2016, U.S. Appl. No. 14/510,913, filed Oct. 9, 2014.
Office Action dated Jul. 29, 2016, U.S. Appl. No. 14/473,941, filed Aug. 29, 2014.
Office Action dated Jul. 28, 2016, U.S. Appl. No. 14/284,212, filed May 21, 2016.
Office Action dated Jan. 31, 2017, U.S. Appl. No. 13/184,526, filed Jul. 16, 2011.
Office Action dated Jan. 27, 2017, U.S. Appl. No. 14/216,292, filed Mar. 17, 2014.
Office Action dated Jan. 26, 2017, U.S. Appl. No. 13/786,328, filed Mar. 5, 2013.
Office Action dated Dec. 2, 2016, U.S. Appl. No. 14/512,268, filed Oct. 10, 2014
Office Action dated Dec. 1, 2016, U.S. Appl. No. 13/899,849, filed May 22, 2013.
Office Action dated Dec. 1, 2016, U.S. Appl. No. 13/656,438, filed Oct. 19, 2012.
Office Action dated Nov. 30, 2016, U.S. Appl. No. 13/598,204, filed Aug. 29, 2012.
Office Action dated Nov. 21, 2016, U.S. Appl. No. 13/669,357, filed Nov. 5, 2012.
Office Action dated Feb. 8, 2017, U.S. Appl. No. 14/473,941, filed Aug. 29, 2014.
Office Action dated Feb. 8, 2017, U.S. Appl. No. 14/822,380, filed Aug. 10, 2015.
"Network based IP VPN Architecture using Virtual Routers" Paul Knight et al.

(56) References Cited

OTHER PUBLICATIONS

Yang Yu et al "A Framework of using OpenFlow to handle transient link failure", TMEE, 2011 International Conference on, IEEE, Dec. 16, 2011.
Office Action for U.S. Appl. No. 15/227,789, dated Feb. 27, 2017.
Office Action for U.S. Appl. No. 14/822,380, dated Feb. 8, 2017.
Office Action for U.S. Appl. No. 14/704,660, dated Feb. 27, 2017.
Office Action for U.S. Appl. No. 14/510,913, dated Mar. 3, 2017.
Office Action for U.S. Appl. No. 14/473,941, dated Feb. 8, 2017.
Office Action for U.S. Appl. No. 14/329,447, dated Feb. 10, 2017.
Office Action for U.S. Appl. No. 14/662,095, dated Mar. 24, 2017.
Office Action for U.S. Appl. No. 15/005,967, dated Mar. 31, 2017.
Office Action for U.S. Appl. No. 15/215,377, dated Apr. 7, 2017.
Office Action for U.S. Appl. No. 13/098,490, dated Apr. 6, 2017.
Office Action for U.S. Appl. No. 14/662,092, dated Mar. 29, 2017.
Office Action for U.S. Appl. No. 14/817,097, dated May 4, 2017.
Office Action for U.S. Appl. No. 14/872,966, dated Apr. 20, 2017.
Office Action for U.S. Appl. No. 14/680,915, dated May 3, 2017.
Office Action for U.S. Appl. No. 14/792,166, dated Apr. 26, 2017.
Office Action for U.S. Appl. No. 14/660,803, dated May 17, 2017.
Office Action for U.S. Appl. No. 14/488,173, dated May 12, 2017.
Office Action for U.S. Appl. No. 13/288,822, dated May 26, 2017.
Office Action for U.S. Appl. No. 14/329,447, dated Jun. 8, 2017.
Office Action for U.S. Appl. No. 14/510,913, dated Jun. 30, 2017.
Office Action for U.S. Appl. No. 15/005,946, dated Jul. 14, 2017.
Office Action for U.S. Appl. No. 13/092,873, dated Jul. 19, 2017.
Office Action for U.S. Appl. No. 15/047,539, dated Aug. 7, 2017.
Office Action for U.S. Appl. No. 14/830,035, dated Aug. 28, 2017.
Office Action for U.S. Appl. No. 13/098,490, dated Aug. 24, 2017.
Office Action for U.S. Appl. No. 13/786,328, dated Aug. 21, 2017.
Office Action for U.S. Appl. No. 14/216,292, dated Oct. 6, 2017.
Office Action dated Oct. 25, 2017, U.S. Appl. No. 14/867,865, filed Sep. 28, 2015.
Office action dated Oct. 26, 2017, U.S. Appl. No. 14/817,097, filed Aug. 3, 2015.
Office Action dated Mar. 20, 2018, U.S. Appl. No. 14/867,865, filed Sep. 28, 2015.
Office Action dated Jun. 13, 2018, U.S. Appl. No. 13/786,328, filed Mar. 5, 2013.
IEEE et al., "Amendment to Carrier Sense Multiple Access with Collision Detection (CSMA/CD) Access Method and Physical Layer Specifications—Aggregation of Multiple Link Segments", Mar. 30, 2000, IEEE Computer Society, IEEE Std 802.3ad-2000, pp. 116-117.
Office Action dated Jul. 13, 2018, U.S. Appl. No. 15/402,924, filed Jul. 13, 2018.
Office Action dated Jul. 24, 2018, U.S. Appl. No. 14/799,371, filed Jul. 24, 2018.

\* cited by examiner

ADVANCED LINK TRACKING FOR VIRTUAL CLUSTER SWITCHING

RELATED APPLICATIONS

This application is a continuation application of application Ser. No. 13/092,460, entitled "Advanced Link Tracking for Virtual Cluster Switching," by inventors Suresh Vobbilisetty and Phanidhar Koganti, filed 22 Apr. 2011, which claims the benefit of U.S. Provisional Application No. 61/352,255, entitled "Advanced Link Tracking For Virtual Cluster Switching," by inventors Suresh Vobbilisetty, and Phanidhar Koganti, filed 7 Jun. 2010, the disclosure of which is incorporated by reference herein.

The present disclosure is related to U.S. patent application Ser. No. 12/725,249, entitled "REDUNDANT HOST CONNECTION IN A ROUTED NETWORK," by inventors Somesh Gupta, Anoop Ghanwani, Phanidhar Koganti, and Shunjia Yu, filed 16 Mar. 2010; and U.S. patent application Ser. No. 13/087,239, entitled "VIRTUAL CLUSTER SWITCHING," by inventors Suresh Vobbilisetty and Dilip Chatwani, filed 14 Apr. 2011;

the disclosures of which are incorporated by reference herein.

BACKGROUND

Field

The present disclosure relates to network design. More specifically, the present disclosure relates to a method and system for advanced link state monitoring in a virtual cluster switch.

Related Art

The relentless growth of the Internet has brought with it an insatiable demand for bandwidth. As a result, equipment vendors race to build larger, faster, and more versatile switches to move traffic. However, the size of a switch cannot grow infinitely. It is limited by physical space, power consumption, and design complexity, to name a few factors. More importantly, because an overly large system often does not provide economy of scale due to its complexity, simply increasing the size and throughput of a switch may prove economically unviable due to the increased per-port cost.

One way to increase the throughput of a switch system is to use switch stacking. In switch stacking, multiple smaller-scale, identical switches are interconnected in a special pattern to form a larger logical switch. However, switch stacking requires careful configuration of the ports and inter-switch links. The amount of required manual configuration becomes prohibitively complex and tedious when the stack reaches a certain size, which precludes switch stacking from being a practical option in building a large-scale switching system. Furthermore, a system based on stacked switches often has topology limitations which restrict the scalability of the system due to fabric bandwidth considerations.

In addition, the evolution of virtual computing has placed additional requirements on the network. For example, as the locations of virtual servers become more mobile and dynamic, or as the link state within a network changes, it is often desirable that the network configuration and the virtual machines can respond to the changes in a timely fashion. However, at present, there are no readily applicable solution that can achieve this goal without using proprietary communication protocols.

SUMMARY

One embodiment of the present invention provides a switch system. The switch includes a port that couples to a server hosting a number of virtual machines. The switch also includes a link tracking module. During operation, the link tracking module determines that reachability to at least one end host coupled to a virtual cluster switch of which the switch is a member is disrupted. The link tracking module then determines that at least one virtual machine coupled to the port is affected by the disrupted reachability, and communicates to the server hosting the affected virtual machine about the disrupted reachability.

In a variation on this embodiment, the link tracking module monitors at least a link coupled to the switch, a port on the switch, or both.

In a variation on this embodiment, while communicating to the server, the link tracking module communicates with a hypervisor residing in the server.

In a variation on this embodiment, the switch includes a routing mechanism configured to update a network topology and corresponding reachability information upon detecting a link or port failure.

In a variation on this embodiment, the virtual cluster switch includes a number of member switches, which are allowed to be coupled in an arbitrary topology. Furthermore, the virtual cluster switch appears to be a single logical switch.

One embodiment of the present invention provides a system that facilitates advanced link tracking. The system includes a first switch coupled to a first network interface of a server which hosts a number of virtual machines and a second switch coupled to a second network interface of the server. The first switch comprises a link monitoring mechanism. During operation, the link monitoring mechanism determines that reachability via the first switch to at least one end host coupled to the system is disrupted. The link monitoring mechanism further determines that at least one virtual machine is affected by the disrupted reachability, and communicates to the server about the disrupted reachability.

DETAILED DESCRIPTION

Figure 1A:
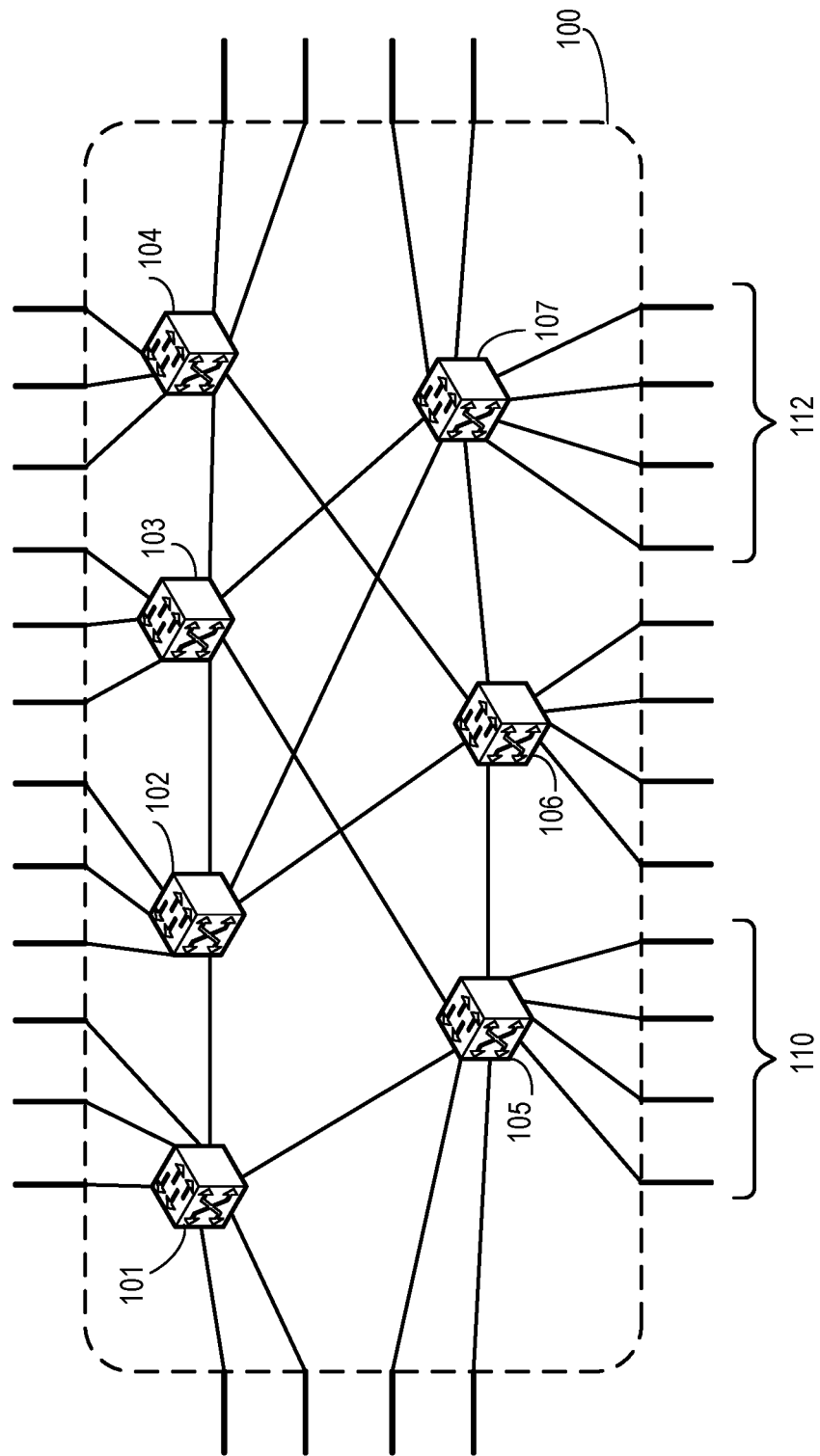
FIG. 1A illustrates an exemplary virtual cluster switch (VCS) system, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of dynamically notifying end hosts about the link state within a network is solved by notifying the physical end host and the corresponding virtual machines about the disrupted reachability via advanced link tracking. A large-scale logical switch (referred to as a "virtual cluster switch" or VCS herein) is formed using a number of smaller physical switches. The automatic configuration capability provided by the control plane running on each physical switch allows any number of switches to be connected in an arbitrary topology without requiring tedious manual configuration of the ports and links. This feature makes it possible to use many smaller, inexpensive switches to construct a large cluster switch, which can be viewed as a single logical switch externally. The VCS facilitate fast detection of any internal link failure or external port failure. When such a failure affects the reachability of one or more hosts via a given port, the affected hosts (and the associated virtual machines) are notified via their corresponding ingress ports. This feature allows the affected virtual machines to be re-configured to use a different ingress port on the VCS, thereby bypassing the failure. In this disclosure, the description in conjunction with FIGS. 1-9 is associated with the general architecture of VCS, and the description in conjunction with FIG. 10 and onward provide more details on the advanced link tracking mechanism.

It should be noted that a virtual cluster switch is not the same as conventional switch stacking. In switch stacking, multiple switches are interconnected at a common location (often within the same rack), based on a particular topology, and manually configured in a particular way. These stacked switches typically share a common address, e.g., IP address, so they can be addressed as a single switch externally. Furthermore, switch stacking requires a significant amount of manual configuration of the ports and inter-switch links. The need for manual configuration prohibits switch stacking from being a viable option in building a large-scale switching system. The topology restriction imposed by switch stacking also limits the number of switches that can be stacked. This is because it is very difficult, if not impossible, to design a stack topology that allows the overall switch bandwidth to scale adequately with the number of switch units.

In contrast, a VCS can include an arbitrary number of switches with individual addresses, can be based on an arbitrary topology, and does not require extensive manual configuration. The switches can reside in the same location, or be distributed over different locations. These features overcome the inherent limitations of switch stacking and make it possible to build a large "switch farm" which can be treated as a single, logical switch. Due to the automatic configuration capabilities of the VCS, an individual physical switch can dynamically join or leave the VCS without disrupting services to the rest of the network.

Furthermore, the automatic and dynamic configurability of VCS allows a network operator to build its switching system in a distributed and "pay-as-you-grow" fashion without sacrificing scalability. The VCS's ability to respond to changing network conditions makes it an ideal solution in a virtual computing environment, where network loads often change with time.

Although this disclosure is presented using examples based on the Transparent Interconnection of Lots of Links (TRILL) as the transport protocol and the Fibre Channel (FC) fabric protocol as the control-plane protocol, embodiments of the present invention are not limited to TRILL networks, or networks defined in a particular Open System Interconnection Reference Model (OSI reference model) layer. For example, a VCS can also be implemented with switches running multi-protocol label switching (MPLS) protocols for the transport. In addition, the terms "RBridge" and "switch" are used interchangeably in this disclosure. The use of the term "RBridge" does not limit embodiments of the present invention to TRILL networks only. The TRILL protocol is described in IETF draft "RBridges: Base Protocol Specification," available at http://tools.ietf.org/html/draft-ietf-trill-rbridge-protocol, which is incorporated by reference herein The terms "virtual cluster switch," "virtual cluster switching," and "VCS" refer to a group of interconnected physical switches operating as a single logical switch. The control plane for these physical switches provides the ability to automatically configure a given physical switch, so that when it joins the VCS, little or no manual configuration is required.

The term "RBridge" refers to routing bridges, which are bridges implementing the TRILL protocol as described in IETF draft "RBridges: Base Protocol Specification." Embodiments of the present invention are not limited to the application among RBridges. Other types of switches, routers, and forwarders can also be used.

The terms "frame" or "packet" refer to a group of bits that can be transported together across a network. "Frame" should not be interpreted as limiting embodiments of the present invention to layer-2 networks. "Packet" should not be interpreted as limiting embodiments of the present invention to layer-3 networks. "Frame" or "packet" can be replaced by other terminologies referring to a group of bits, such as "cell" or "datagram."

VCS Architecture

FIG. 1A illustrates an exemplary virtual cluster switch system, in accordance with an embodiment of the present invention. In this example, a VCS 100 includes physical switches 101, 102, 103, 104, 105, 106, and 107. A given physical switch runs an Ethernet-based transport protocol on its ports (e.g., TRILL on its inter-switch ports, and Ethernet transport on its external ports), while its control plane runs an FC switch fabric protocol stack. The TRILL protocol facilitates transport of Ethernet frames within and across VCS 100 in a routed fashion (since TRILL provides routing functions to Ethernet frames). The FC switch fabric protocol stack facilitates the automatic configuration of individual physical switches, in a way similar to how a conventional FC switch fabric is formed and automatically configured. In one embodiment, VCS 100 can appear externally as an ultra-high-capacity Ethernet switch. More details on FC network architecture, protocols, naming/address conventions, and various standards are available in the documentation available from the NCITS/ANSI T11 committee (www.t11.org) and publicly available literature, such as "Designing Storage Area Networks," by Tom Clark, 2nd Ed., Addison Wesley, 2003, the disclosures of which are incorporated by reference in their entirety herein.

A physical switch may dedicate a number of ports for external use (i.e., to be coupled to end hosts or other switches external to the VCS) and other ports for inter-switch connection. Viewed externally, VCS 100 appears to be one switch to a device from the outside, and any port from any of the physical switches is considered one port on the VCS. For example, port groups 110 and 112 are both VCS external ports and can be treated equally as if they were ports on a common physical switch, although switches 105 and 107 may reside in two different locations.

The physical switches can reside at a common location, such as a data center or central office, or be distributed in different locations. Hence, it is possible to construct a large-scale centralized switching system using many smaller, inexpensive switches housed in one or more chassis at the same location. It is also possible to have the physical switches placed at different locations, thus creating a logical switch that can be accessed from multiple locations. The topology used to interconnect the physical switches can also be versatile. VCS 100 is based on a mesh topology. In further embodiments, a VCS can be based on a ring, fat tree, or other types of topologies.

In one embodiment, the protocol architecture of a VCS is based on elements from the standard IEEE 802.1Q Ethernet bridge, which is emulated over a transport based on the Fibre Channel Framing and Signaling-2 (FC-FS-2) standard. The resulting switch is capable of transparently switching frames from an ingress Ethernet port from one of the edge switches to an egress Ethernet port on a different edge switch through the VCS.

Figure 1B:
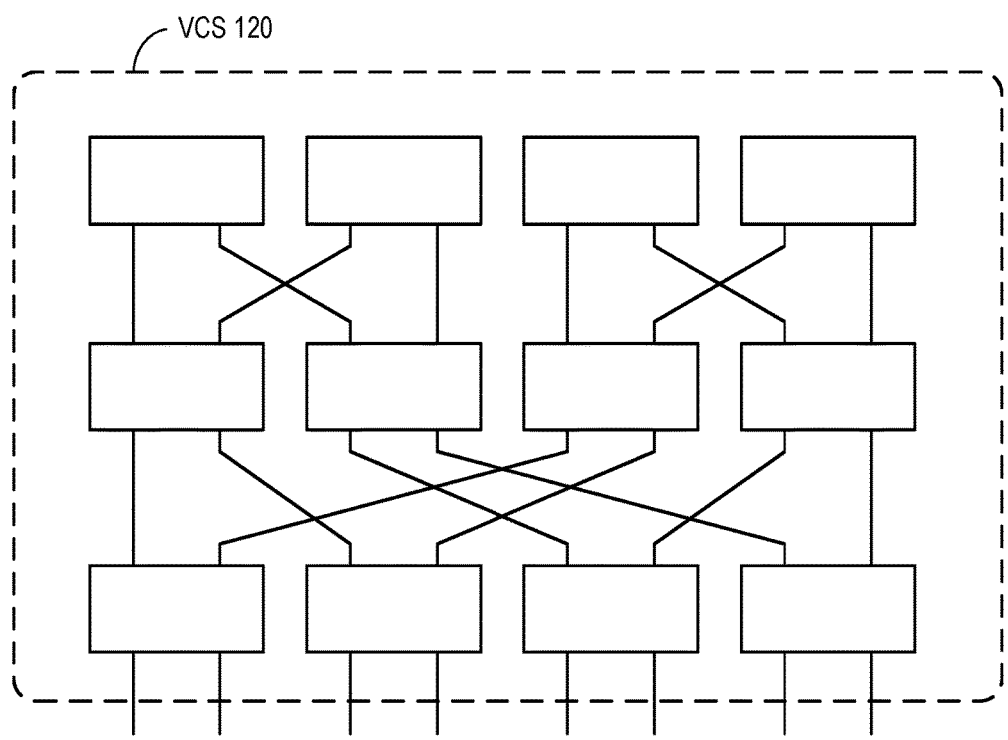
FIG. 1B illustrates an exemplary VCS system where the member switches are configured in a CLOS network, in accordance with an embodiment of the present invention.

Because of its automatic configuration capability, a VCS can be dynamically expanded as the network demand increases. In addition, one can build a large-scale switch using many smaller physical switches without the burden of manual configuration. For example, it is possible to build a high-throughput fully non-blocking switch using a number of smaller switches. This ability to use small switches to build a large non-blocking switch significantly reduces the cost associated switch complexity. FIG. 1B presents an exemplary VCS with its member switches connected in a CLOS network, in accordance with one embodiment of the present invention. In this example, a VCS 120 forms a fully non-blocking 8×8 switch, using eight 4×4 switches and four 2×2 switches connected in a three-stage CLOS network. A large-scale switch with a higher port count can be built in a similar way.

Figure 2:
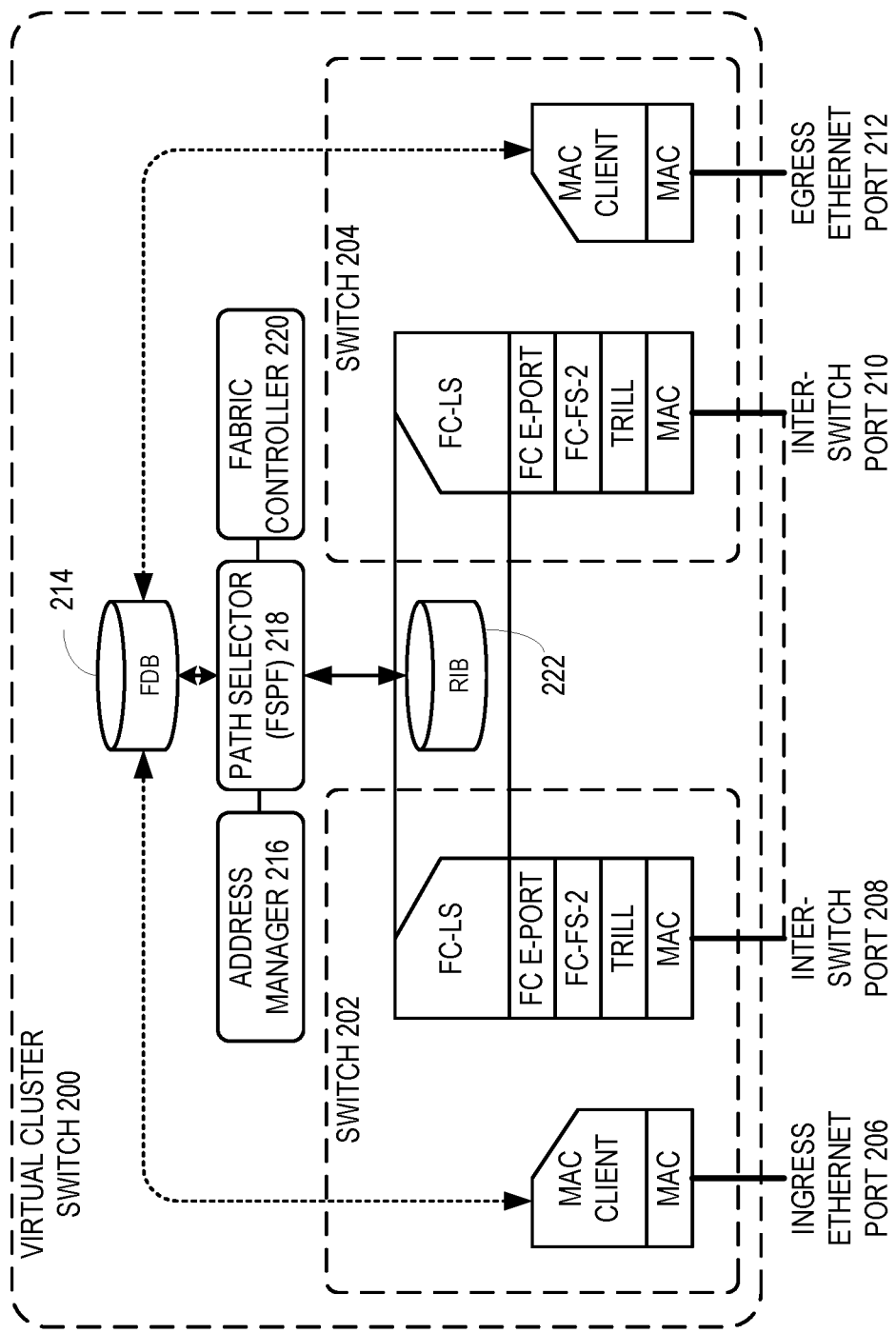
FIG. 2 illustrates the protocol stack within a virtual cluster switch, in accordance with an embodiment of the present invention.

FIG. 2 illustrates the protocol stack within a virtual cluster switch, in accordance with an embodiment of the present invention. In this example, two physical switches 202 and 204 are illustrated within a VCS 200. Switch 202 includes an ingress Ethernet port 206 and an inter-switch port 208. Switch 204 includes an egress Ethernet port 212 and an inter-switch port 210. Ingress Ethernet port 206 receives Ethernet frames from an external device. The Ethernet header is processed by a medium access control (MAC) layer protocol. On top of the MAC layer is a MAC client layer, which hands off the information extracted from the frame's Ethernet header to a forwarding database (FDB) 214. Typically, in a conventional IEEE 802.1Q Ethernet switch, FDB 214 is maintained locally in a switch, which would perform a lookup based on the destination MAC address and the VLAN indicated in the Ethernet frame. The lookup result would provide the corresponding output port. However, since VCS 200 is not one single physical switch, FDB 214 would return the egress switch's identifier (i.e., switch 204's identifier). In one embodiment, FDB 214 is a data structure replicated and distributed among all the physical switches. That is, every physical switch maintains its own copy of FDB 214. When a given physical switch learns the source MAC address and VLAN of an Ethernet frame (similar to what a conventional IEEE 802.1Q Ethernet switch does) as being reachable via the ingress port, the learned MAC and VLAN information, together with the ingress Ethernet port and switch information, is propagated to all the physical switches so every physical switch's copy of FDB 214 can remain synchronized. This prevents forwarding based on stale or incorrect information when there are changes to the connectivity of end stations or edge networks to the VCS.

The forwarding of the Ethernet frame between ingress switch 202 and egress switch 204 is performed via inter-switch ports 208 and 210. The frame transported between the two inter-switch ports is encapsulated in an outer MAC header and a TRILL header, in accordance with the TRILL standard. The protocol stack associated with a given inter-switch port includes the following (from bottom up): MAC layer, TRILL layer, FC-FS-2 layer, FC E-Port layer, and FC link services (FC-LS) layer. The FC-LS layer is responsible for maintaining the connectivity information of a physical switch's neighbor, and populating an FC routing information base (RIB) 222. This operation is similar to what is done in an FC switch fabric. The FC-LS protocol is also responsible for handling joining and departure of a physical switch in VCS 200. The operation of the FC-LS layer is specified in the FC-LS standard, which is available at http:// www.t11.org/ftp/t11/member/fc/ls/06-393v5.pdf, the disclosure of which is incorporated herein in its entirety.

During operation, when FDB 214 returns the egress switch 204 corresponding to the destination MAC address of the ingress Ethernet frame, the destination egress switch's identifier is passed to a path selector 218. Path selector 218 performs a fabric shortest-path first (FSPF)-based route lookup in conjunction with RIB 222, and identifies the next-hop switch within VCS 200. In other words, the routing is performed by the FC portion of the protocol stack, similar to what is done in an FC switch fabric.

Also included in each physical switch are an address manager 216 and a fabric controller 220. Address manager 216 is responsible for configuring the address of a physical switch when the switch first joins the VCS. For example, when switch 202 first joins VCS 200, address manager 216 can negotiate a new FC switch domain ID, which is subsequently used to identify the switch within VCS 200. Fabric controller 220 is responsible for managing and configuring the logical FC switch fabric formed on the control plane of VCS 200.

One way to understand the protocol architecture of VCS is to view the VCS as an FC switch fabric with an Ethernet/TRILL transport. Each physical switch, from an external point of view, appears to be a TRILL RBridge. However, the switch's control plane implements the FC switch fabric software. In other words, embodiments of the present invention facilitate the construction of an "Ethernet switch fabric" running on FC control software. This unique combination provides the VCS with automatic configuration capability and allows it to provide the ubiquitous Ethernet services in a very scalable fashion.

Figure 3:
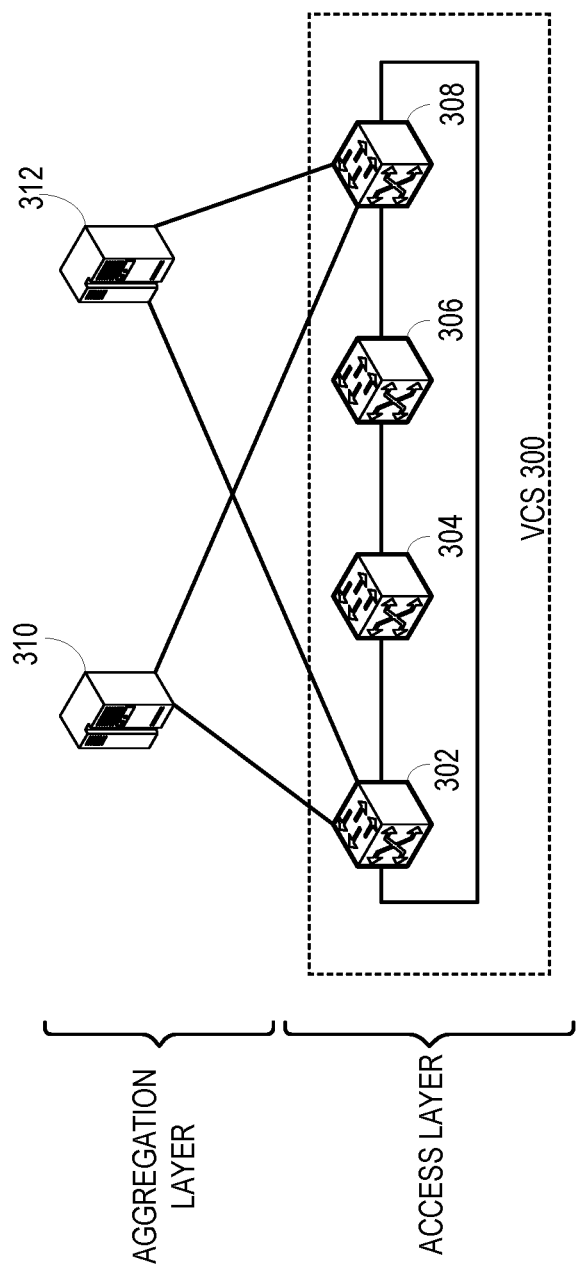
FIG. 3 illustrates an exemplary configuration of a virtual cluster switch, in accordance with an embodiment of the present invention.

FIG. 3 illustrates an exemplary configuration of a virtual cluster switch, in accordance with an embodiment of the present invention. In this example, a VCS 300 includes four physical switches 302, 304, 306, and 308. VCS 300 constitutes an access layer which is coupled to two aggregation switches 310 and 312. Note that the physical switches within VCS 300 are connected in a ring topology. Aggregation switch 310 or 312 can connect to any of the physical switches within VCS 300. For example, aggregation switch 310 is coupled to physical switches 302 and 308. These two links are viewed as a trunked link to VCS 300, since the corresponding ports on switches 302 and 308 are considered to be from the same logical switch, VCS 300. Note that, without VCS, such topology would not have been possible, because the FDB needs to remain synchronized, which is facilitated by the VCS.

Figure 4:
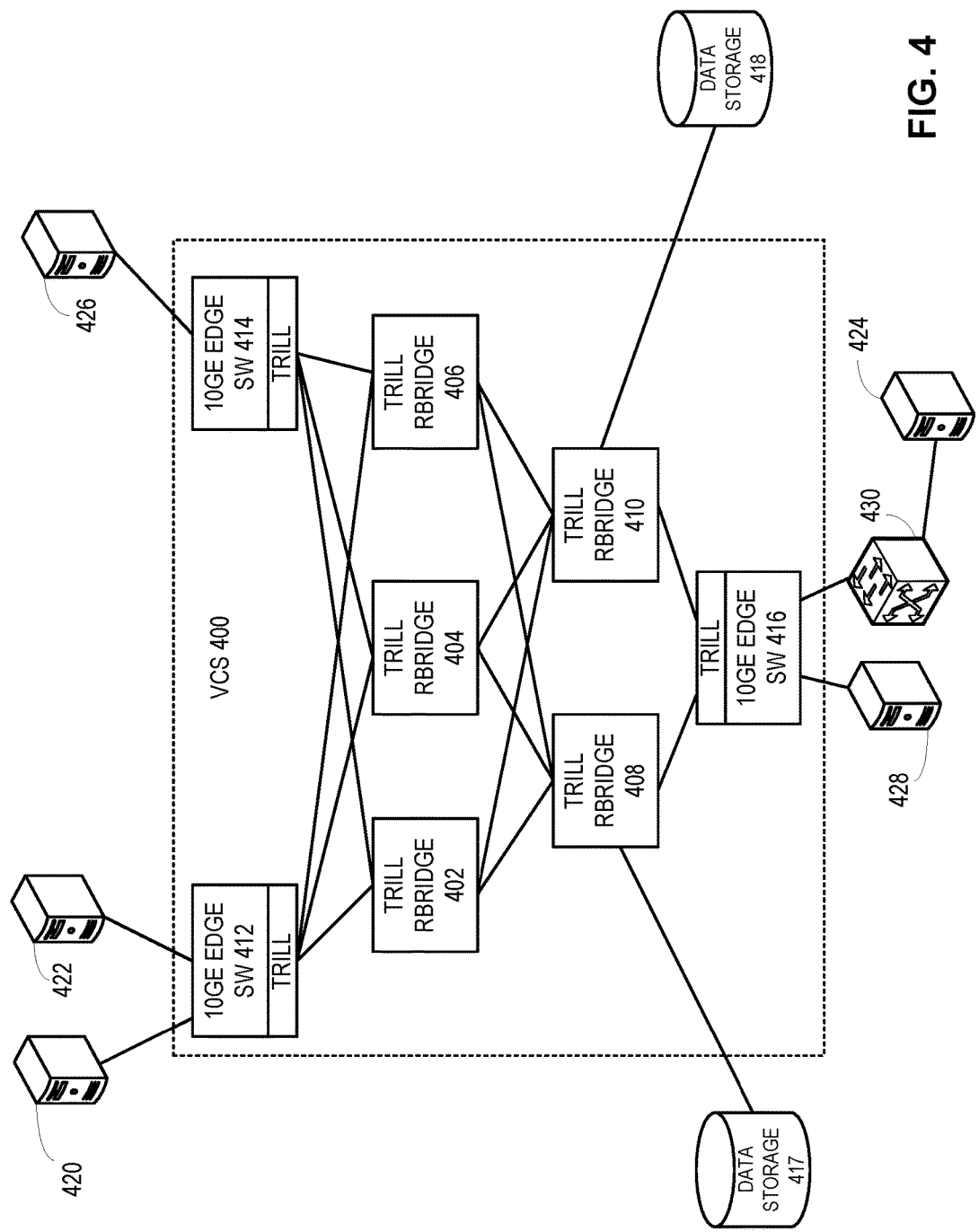
FIG. 4 illustrates an exemplary configuration of how a virtual cluster switch can be connected to different edge networks, in accordance with an embodiment of the present invention.

FIG. 4 illustrates an exemplary configuration of how a virtual cluster switch can be connected to different edge networks, in accordance with an embodiment of the present invention. In this example, a VCS 400 includes a number of TRILL RBridges 402, 404, 406, 408, and 410, which are controlled by the FC switch-fabric control plane. Also included in VCS 400 are RBridges 412, 414, and 416. Each RBridge has a number of edge ports which can be connected to external edge networks.

For example, RBridge 412 is coupled with hosts 420 and 422 via 10GE ports. RBridge 414 is coupled to a host 426 via a 10GE port. These RBridges have TRILL-based inter-switch ports for connection with other TRILL RBridges in VCS 400. Similarly, RBridge 416 is coupled to host 428 and an external Ethernet switch 430, which is coupled to an external network that includes a host 424. In addition, network equipment can also be coupled directly to any of the physical switches in VCS 400. As illustrated here, TRILL RBridge 408 is coupled to a data storage 417, and TRILL RBridge 410 is coupled to a data storage 418.

Although the physical switches within VCS 400 are labeled as "TRILL RBridges," they are different from the conventional TRILL RBridge in the sense that they are controlled by the FC switch fabric control plane. In other words, the assignment of switch addresses, link discovery and maintenance, topology convergence, routing, and forwarding can be handled by the corresponding FC protocols. Particularly, each TRILL RBridge's switch ID or nickname is mapped from the corresponding FC switch domain ID, which can be automatically assigned when a switch joins VCS 400 (which is logically similar to an FC switch fabric).

Note that TRILL is only used as a transport between the switches within VCS 400. This is because TRILL can readily accommodate native Ethernet frames. Also, the TRILL standards provide a ready-to-use forwarding mechanism that can be used in any routed network with arbitrary topology (although the actual routing in VCS is done by the FC switch fabric protocols). Embodiments of the present invention should be not limited to using only TRILL as the transport. Other protocols (such as multi-protocol label switching (MPLS) or Internet Protocol (IP)), either public or proprietary, can also be used for the transport.

VCS Formation

In one embodiment, a VCS is created by instantiating a logical FC switch in the control plane of each switch. After the logical FC switch is created, a virtual generic port (denoted as G_Port) is created for each Ethernet port on the RBridge. A G_Port assumes the normal G_Port behavior from the FC switch perspective. However, in this case, since the physical links are based on Ethernet, the specific transition from a G_Port to either an FC F_Port or E_Port is determined by the underlying link and physical layer protocols. For example, if the physical Ethernet port is connected to an external device which lacks VCS capabilities, the corresponding G_Port will be turned into an F_Port. On the other hand, if the physical Ethernet port is connected to a switch with VCS capabilities and it is confirmed that the switch on the other side is part of a VCS, then the G_Port will be turned into an E_port.

Figure 5A:
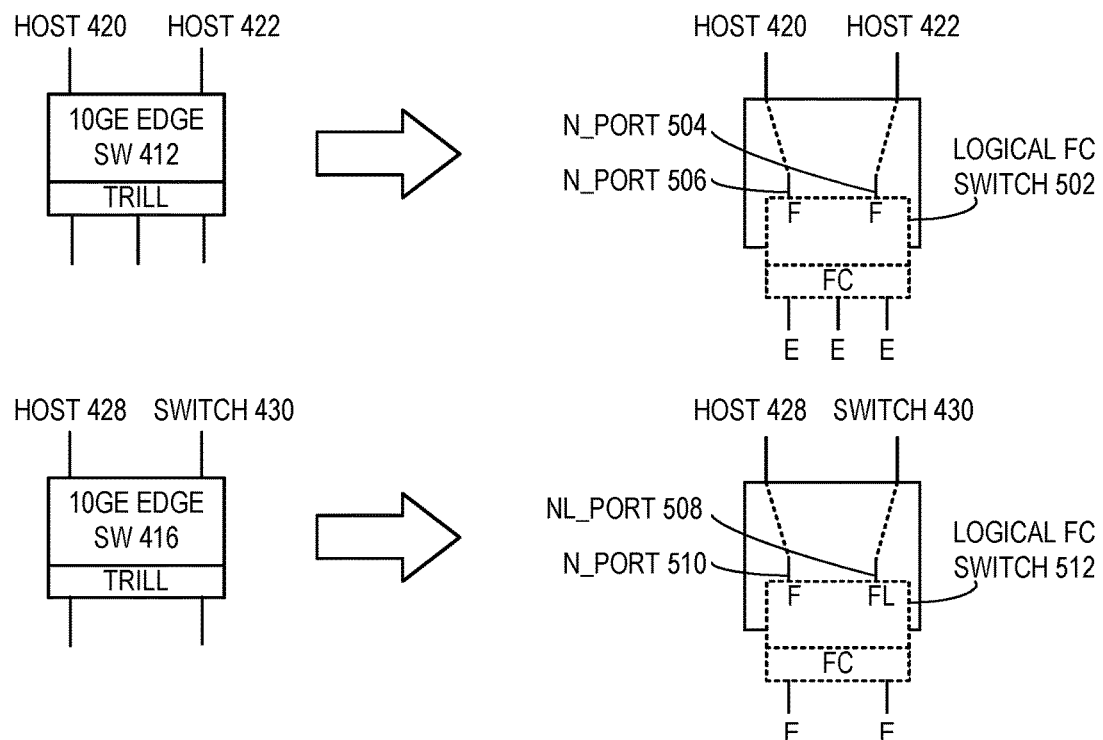
FIG. 5A illustrates how a logical Fibre Channel switch fabric is formed in a virtual cluster switch in conjunction with the example in FIG. 4, in accordance with an embodiment of the present invention.

FIG. 5A illustrates how a logical Fibre Channel switch fabric is formed in a virtual cluster switch in conjunction with the example in FIG. 4, in accordance with an embodiment of the present invention. RBridge 412 contains a virtual, logical FC switch 502. Corresponding to the physical Ethernet ports coupled to hosts 420 and 422, logical FC switch 502 has two logical F_Ports, which are logically coupled to hosts 420 and 422. In addition, two logical N_Ports, 506 and 504, are created for hosts 420 and 422, respectively. On the VCS side, logical FC switch 502 has three logical E_Ports, which are to be coupled with other logical FC switches in the logical FC switch fabric in the VCS.

Similarly, RBridge 416 contains a virtual, logical FC switch 512. Corresponding to the physical Ethernet ports coupled to host 428 and external switch 430, logical FC switch 512 has a logical F_Port coupled to host 428, and a logical FL_Port coupled to switch 430. In addition, a logical N_Port 510 is created for host 428, and a logical NL_Port 508 is created for switch 430. Note that the logical FL_Port is created because that port is coupled to a switch (switch 430), instead of a regular host, and therefore logical FC switch 512 assumes an arbitrated loop topology leading to switch 430. Logical NL_Port 508 is created based on the same reasoning to represent a corresponding NL_Port on switch 430. On the VCS side, logical FC switch 512 has two logical E_Ports, which to be coupled with other logical FC switches in the logical FC switch fabric in the VCS.

Figure 5B:
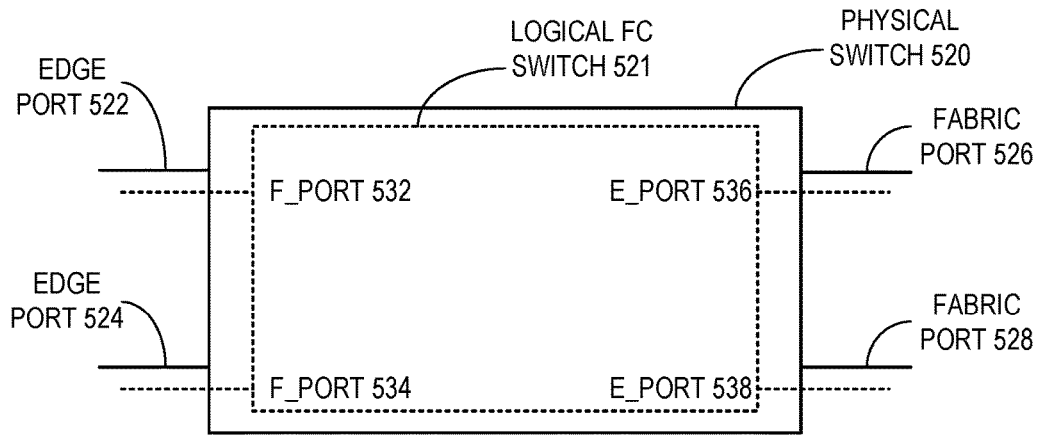
FIG. 5B illustrates an example of how a logical FC switch can be created within a physical Ethernet switch, in accordance with one embodiment of the present invention.

FIG. 5B illustrates an example of how a logical FC switch can be created within a physical Ethernet switch, in accordance with one embodiment of the present invention. The term "fabric port" refers to a port used to couple multiple switches in a VCS. The clustering protocols control the forwarding between fabric ports. The term "edge port" refers to a port that is not currently coupled to another switch unit in the VCS. Standard IEEE 802.1Q and layer-3 protocols control forwarding on edge ports.

In the example illustrated in FIG. 5B, a logical FC switch 521 is created within a physical switch (RBridge) 520. Logical FC switch 521 participates in the FC switch fabric protocol via logical inter-switch links (ISLs) to other switch units and has an FC switch domain ID assigned to it just as a physical FC switch does. In other words, the domain allocation, principal switch selection, and conflict resolution work just as they would on a physical FC ISL.

The physical edge ports 522 and 524 are mapped to logical F_Ports 532 and 534, respectively. In addition, physical fabric ports 526 and 528 are mapped to logical E_Ports 536 and 538, respectively. Initially, when logical FC switch 521 is created (for example, during the boot-up sequence), logical FC switch 521 only has four G_Ports which correspond to the four physical ports. These G_Ports are subsequently mapped to F_Ports or E_Ports, depending on the devices coupled to the physical ports.

Neighbor discovery is the first step in VCS formation between two VCS-capable switches. It is assumed that the verification of VCS capability can be carried out by a handshake process between two neighbor switches when the link is first brought up.

In general, a VCS presents itself as one unified switch composed of multiple member switches. Hence, the creation and configuration of VCS is of critical importance. The VCS configuration is based on a distributed database, which is replicated and distributed over all switches.

In one embodiment, a VCS configuration database includes a global configuration table (GT) of the VCS and a list of switch description tables (STs), each of which describes a VCS member switch. In its simplest form, a member switch can have a VCS configuration database that includes a global table and one switch description table, e.g., [<GT><ST>]. A VCS with multiple switches will have a configuration database that has a single global table and multiple switch description tables, e.g., [<GT><ST0><ST1> . . . <STn−1>]. The number n corresponds to the number of member switches in the VCS. In one embodiment, the GT can include at least the following information: the VCS ID, number of nodes in the VCS, a list of VLANs supported by the VCS, a list of all the switches (e.g., list of FC switch domain IDs for all active switches) in the VCS, and the FC switch domain ID of the principal switch (as in a logical FC switch fabric). A switch description table can include at least the following information: the IN_VCS flag, indication whether the switch is a principal switch in the logical FC switch fabric, the FC switch domain ID for the switch, the FC world-wide name (WWN) for the corresponding logical FC switch; the mapped ID of the switch, and optionally the IP address of the switch.

In addition, each switch's global configuration database is associated with a transaction ID. The transaction ID specifies the latest transaction (e.g., update or change) incurred to the global configuration database. The transaction IDs of the global configuration databases in two switches can be compared to determine which database has the most current information (i.e., the database with the more current transaction ID is more up-to-date). In one embodiment, the transaction ID is the switch's serial number plus a sequential transaction number. This configuration can unambiguously resolve which switch has the latest configuration.

Figure 6:
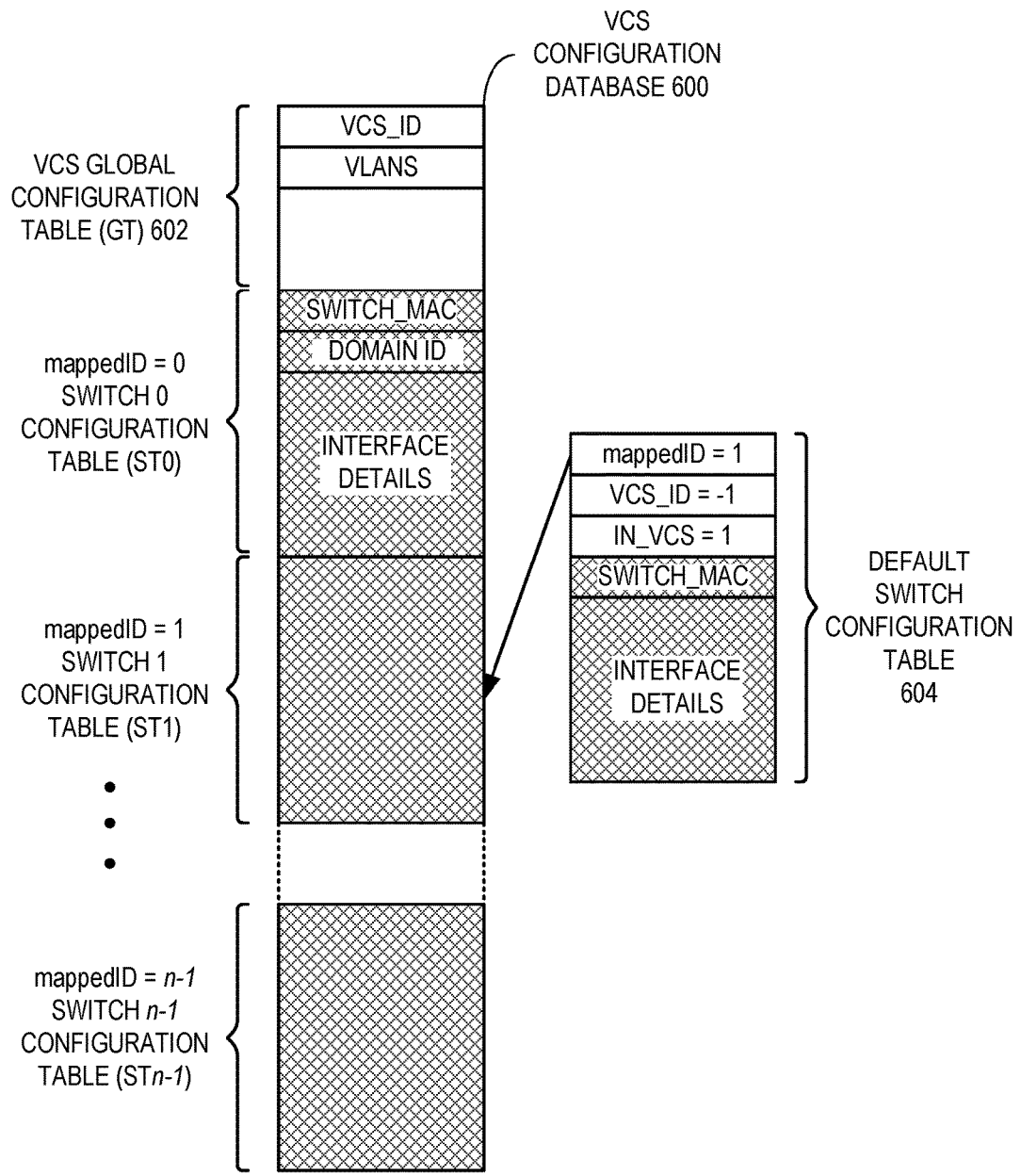
FIG. 6 illustrates an exemplary VCS configuration database, in accordance with an embodiment of the present invention.

As illustrated in FIG. 6, a VCS member switch typically maintains two configuration tables that describe its instance: a VCS configuration database 600, and a default switch configuration table 604. VCS configuration database 600 describes the VCS configuration when the switch is part of a VCS. Default switch configuration table 604 describes the switch's default configuration. VCS configuration database 600 includes a GT 602, which includes a VCS identifier (denoted as VCS_ID) and a VLAN list within the VCS. Also included in VCS configuration database 600 are a number of STs, such as ST0, ST1, and STn. Each ST includes the corresponding member switch's MAC address and FC switch domain ID, as well as the switch's interface details. Note that each switch also has a VCS-mapped ID which is a switch index within the VCS.

In one embodiment, each switch also has a VCS-mapped ID (denoted as "mappedID"), which is a switch index within the VCS. This mapped ID is unique and persistent within the VCS. That is, when a switch joins the VCS for the first time, the VCS assigns a mapped ID to the switch. This mapped ID persists with the switch, even if the switch leaves the VCS. When the switch joins the VCS again at a later time, the same mapped ID is used by the VCS to retrieve previous configuration information for the switch. This feature can reduce the amount of configuration overhead in VCS. Also, the persistent mapped ID allows the VCS to "recognize" a previously configured member switch when it re-joins the VCS, since a dynamically assigned FC fabric domain ID would change each time the member switch joins and is configured by the VCS.

Default switch configuration table 604 has an entry for the mappedID that points to the corresponding ST in VCS configuration database 600. Note that only VCS configuration database 600 is replicated and distributed to all switches in the VCS. Default switch configuration table 604 is local to a particular member switch.

The "IN_VCS" value in default switch configuration table 604 indicates whether the member switch is part of a VCS. A switch is considered to be "in a VCS" when it is assigned one of the FC switch domains by the FC switch fabric with two or more switch domains. If a switch is part of an FC switch fabric that has only one switch domain, i.e., its own switch domain, then the switch is considered to be "not in a VCS."

When a switch is first connected to a VCS, the logical FC switch fabric formation process allocates a new switch domain ID to the joining switch. In one embodiment, only the switches directly connected to the new switch participate in the VCS join operation.

Note that in the case where the global configuration database of a joining switch is current and in sync with the global configuration database of the VCS based on a comparison of the transaction IDs of the two databases (e.g., when a member switch is temporarily disconnected from the VCS and re-connected shortly afterward), a trivial merge is performed. That is, the joining switch can be connected to the VCS, and no change or update to the global VCS configuration database is required.

Figure 7:
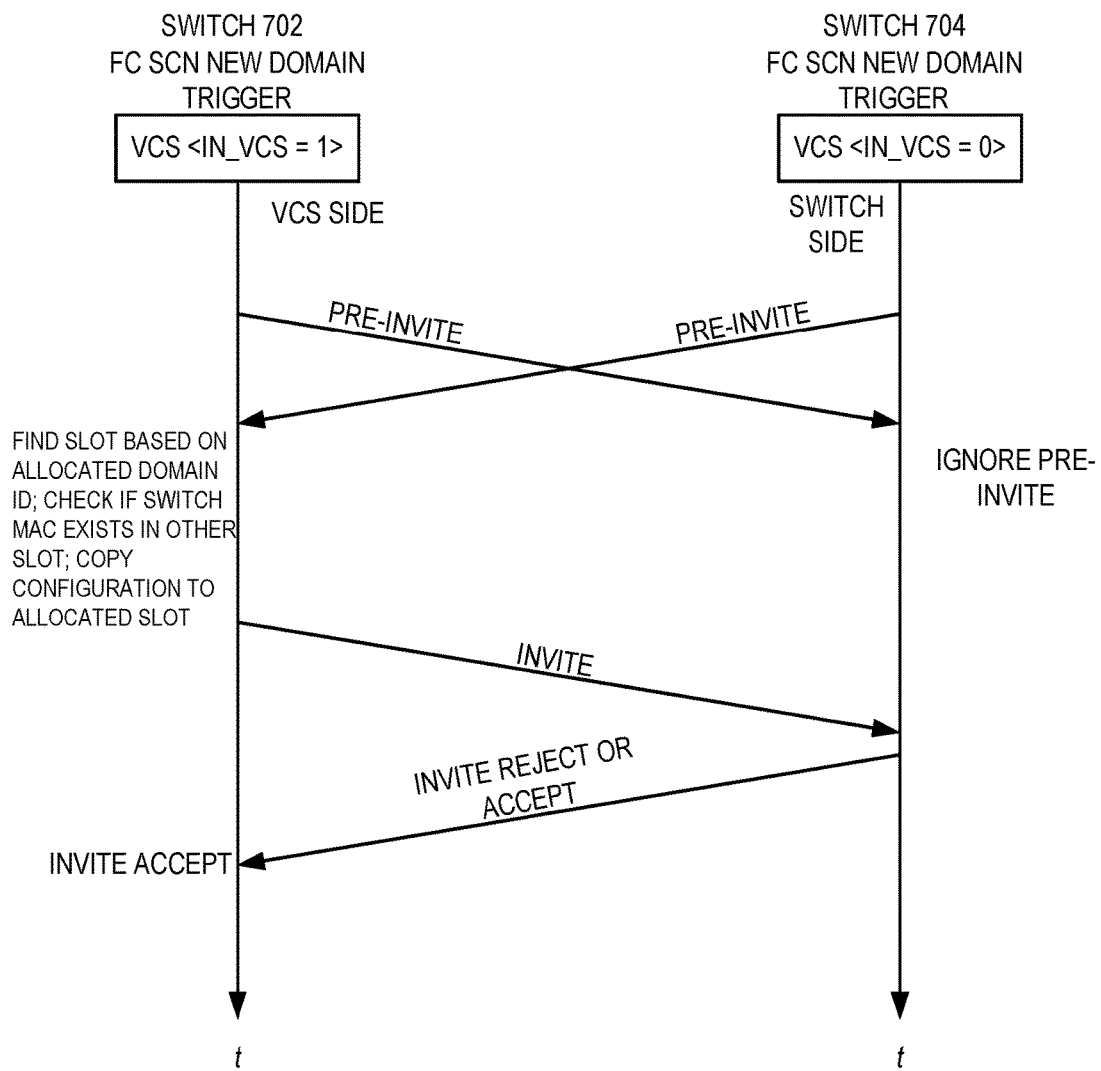
FIG. 7 illustrates an exemplary process of a switch joining a virtual cluster switch, in accordance with an embodiment of the present invention.

FIG. 7 illustrates an exemplary process of a switch joining a virtual cluster switch, in accordance with an embodiment of the present invention. In this example, it is assumed that a switch 702 is within an existing VCS, and a switch 704 is joining the VCS. During operation, both switches 702 and 704 trigger an FC State Change Notification (SCN) process. Subsequently, both switches 702 and 704 perform a PRE-INVITE operation. The pre-invite operation involves the following process.

When a switch joins the VCS via a link, both neighbors on each end of the link present to the other switch a VCS four-tuple of <Prior VCS_ID, SWITCH_MAC, mappedID, IN_VCS> from a prior incarnation, if any. Otherwise, the switch presents to the counterpart a default tuple. If the VCS_ID value was not set from a prior join operation, a VCS_ID value of −1 is used. In addition, if a switch's IN_VCS flag is set to 0, it sends out its interface configuration to the neighboring switch. In the example in FIG. 7, both switches 702 and 704 send the above information to the other switch.

After the above PRE-INVITE operation, a driver switch for the join process is selected. By default, if a switch's IN_VCS value is 1 and the other switch's IN_VCS value is 0, the switch with IN_VCS=1 is selected as the driver switch. If both switches have their IN_VCS values as 1, then nothing happens, i.e., the PRE-INVITE operation would not lead to an INVITE operation. If both switches have their IN_VCS values as 0, then one of the switches is elected to be the driving switch (for example, the switch with a lower FC switch domain ID value). The driving switch's IN_VCS value is then set to 1 and drives the join process.

After switch 702 is selected as the driver switch, switch 702 then attempts to reserve a slot in the VCS configuration database corresponding to the mappedID value in switch 704's PRE-INVITE information. Next, switch 702 searches the VCS configuration database for switch 704's MAC address in any mappedID slot. If such a slot is found, switch 702 copies all information from the identified slot into the reserved slot. Otherwise, switch 702 copies the information received during the PRE-INVITE from switch 704 into the VCS configuration database. The updated VCS configuration database is then propagated to all the switches in the VCS as a prepare operation in the database (note that the update is not committed to the database yet).

Subsequently, the prepare operation may or may not result in configuration conflicts, which may be flagged as warnings or fatal errors. Such conflicts can include inconsistencies between the joining switch's local configuration or policy setting and the VCS configuration. For example, a conflict arises when the joining switch is manually configured to allow packets with a particular VLAN value to pass through, whereas the VCS does not allow this VLAN value to enter the switch fabric from this particular RBridge (for example, when this VLAN value is reserved for other purposes). In one embodiment, the prepare operation is handled locally and/or remotely in concert with other VCS member switches. If there is an un-resolvable conflict, switch 702 sends out a PRE-INVITE-FAILED message to switch 704. Otherwise, switch 702 generates an INVITE message with the VCS's merged view of the switch (i.e., the updated VCS configuration database).

Upon receiving the INVITE message, switch 704 either accepts or rejects the INVITE. The INVITE can be rejected if the configuration in the INVITE is in conflict with what switch 704 can accept. If the INVITE is acceptable, switch 704 sends back an INVITE-ACCEPT message in response. The INVITE-ACCEPT message then triggers a final database commit throughout all member switches in the VCS. In other words, the updated VCS configuration database is updated, replicated, and distributed to all the switches in the VCS.

Layer-2 Services in VCS

In one embodiment, each VCS switch unit performs source MAC address learning, similar to what an Ethernet bridge does. Each {MAC address, VLAN} tuple learned on a physical port on a VCS switch unit is registered into the local Fibre Channel Name Server (FC-NS) via a logical Nx_Port interface corresponding to that physical port. This registration binds the address learned to the specific interface identified by the Nx_Port. Each FC-NS instance on each VCS switch unit coordinates and distributes all locally learned {MAC address, VLAN} tuples with every other FC-NS instance in the fabric. This feature allows the dissemination of locally learned {MAC addresses, VLAN} information to every switch in the VCS. In one embodiment, the learned MAC addresses are aged locally by individual switches.

Figure 8:
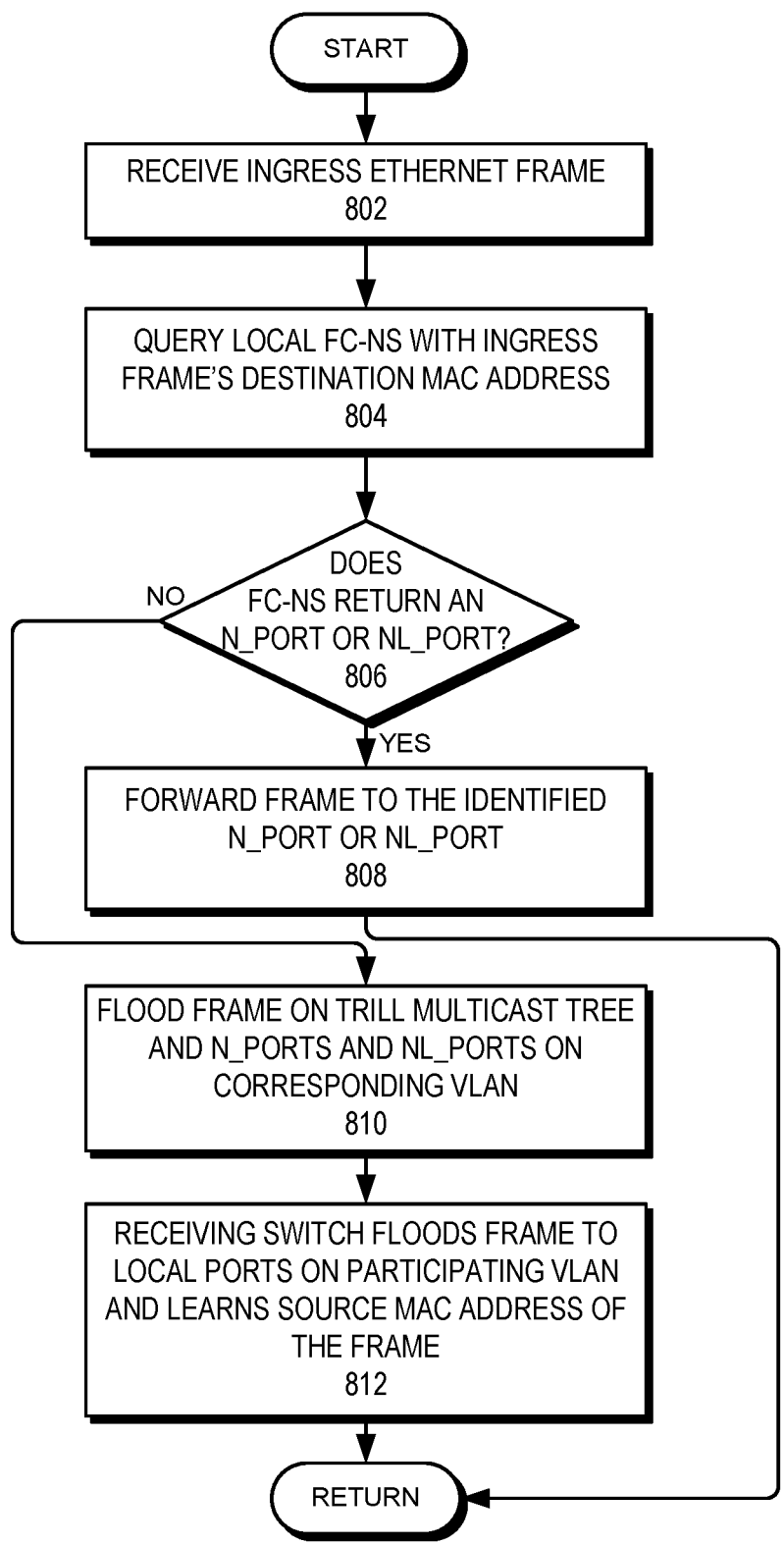
FIG. 8 presents a flowchart illustrating the process of looking up an ingress frame's destination MAC address and forwarding the frame in a VCS, in accordance with one embodiment of the present invention.

FIG. 8 presents a flowchart illustrating the process of looking up an ingress frame's destination MAC address and forwarding the frame in a VCS, in accordance with one embodiment of the present invention. During operation, a VCS switch receives an Ethernet frame at one of its Ethernet ports (operation 802). The switch then extracts the frame's destination MAC address and queries the local FC Name Server (operation 804). Next, the switch determines whether the FC-NS returns an N_Port or an NL_Port identifier that corresponds to an egress Ethernet port (operation 806).

If the FC-NS returns a valid result, the switch forwards the frame to the identified N_Port or NL_Port (operation 808). Otherwise, the switch floods the frame on the TRILL multicast tree as well as on all the N_Ports and NL_Ports that participate in that VLAN (operation 810). This flood/broadcast operation is similar to the broadcast process in a conventional TRILL RBridge, wherein all the physical switches in the VCS will receive and process this frame, and learn the source address corresponding to the ingress RBridge. In addition, each receiving switch floods the frame to its local ports that participate in the frame's VLAN (operation 812). Note that the above operations are based on the presumption that there is a one-to-one mapping between a switch's TRILL identifier (or nickname) and its FC switch domain ID. There is also a one-to-one mapping between a physical Ethernet port on a switch and the corresponding logical FC port.

End-to-End Frame Delivery

Figure 9:
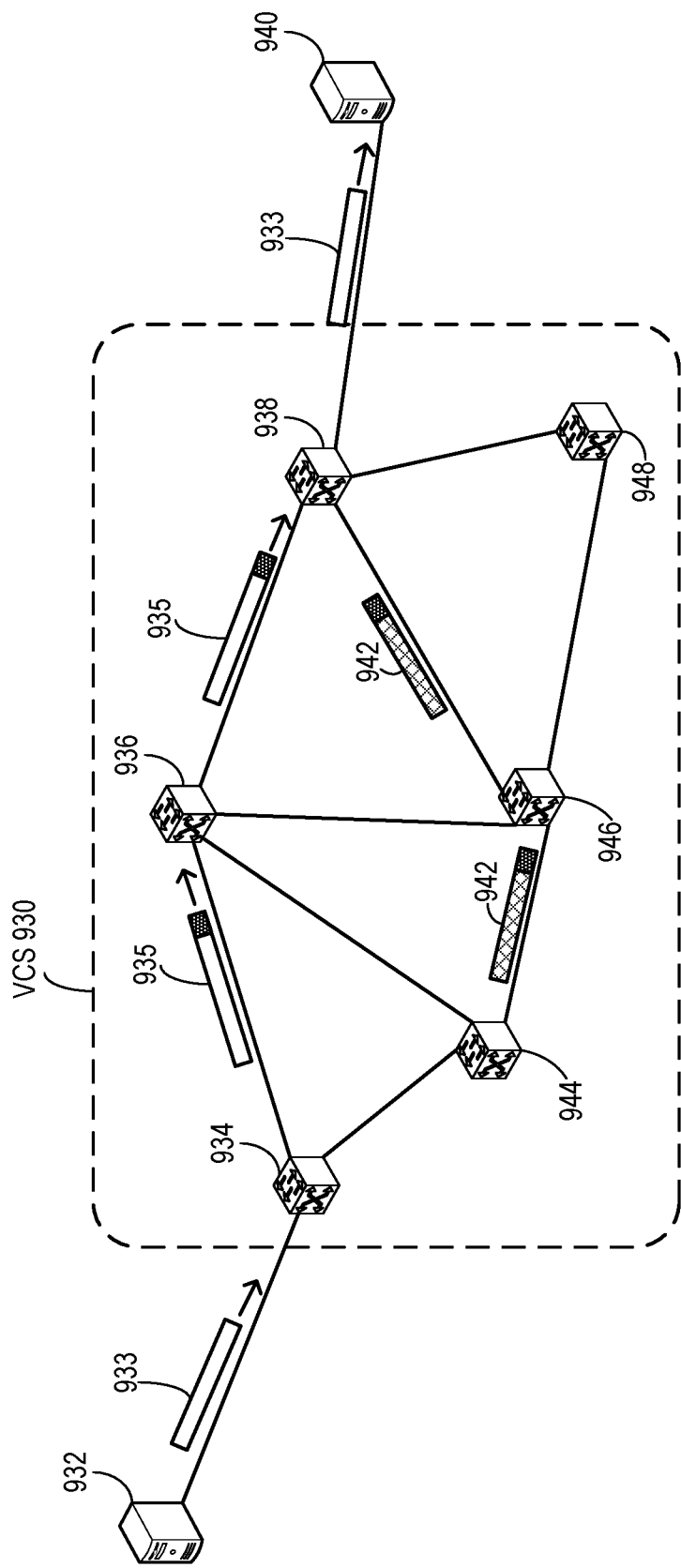
FIG. 9 illustrates how data frames and control frames are transported through a VCS, in accordance with one embodiment of the present invention.

FIG. 9 illustrates how data frames and control frames are transported in a VCS, in accordance with an embodiment of the present invention.

In this example, a VCS 930 includes member switches 934, 936, 938, 944, 946, and 948. An end host 932 is communicating with an end host 940. Switch 934 is the ingress VCS member switch corresponding to host 932, and switch 938 is the egress VCS member switch corresponding to host 938. During operation, host 932 sends an Ethernet frame 933 to host 940. Ethernet frame 933 is first encountered by ingress switch 934. Upon receiving frame 933, switch 934 first extracts frame 933's destination MAC address. Switch 934 then performs a MAC address lookup using the Ethernet name service, which provides the egress switch identifier (i.e., the RBridge identifier of egress switch 938). Based on the egress switch identifier, the logical FC switch in switch 934 performs a routing table lookup to determine the next-hop switch, which is switch 936, and the corresponding output port for forwarding frame 933. The egress switch identifier is then used to generate a TRILL header (which specifies the destination switch's RBridge identifier), and the next-hop switch information is used to generate an outer Ethernet header. Subsequently, switch 934 encapsulates frame 933 with the proper TRILL header and outer Ethernet header, and sends the encapsulated frame 935 to switch 936. Based on the destination RBridge identifier in the TRILL header of frame 935, switch 936 performs a routing table lookup and determines the next hop. Based on the next-hop information, switch 936 updates frame 935's outer Ethernet header and forwards frame 935 to egress switch 938.

Upon receiving frame 935, switch 938 determines that it is the destination RBridge based on frame 935's TRILL header. Correspondingly, switch 938 strips frame 935 of its outer Ethernet header and TRILL header, and inspects the destination MAC address of its inner Ethernet header. Switch 938 then performs a MAC address lookup and determines the correct output port leading to host 940. Subsequently, the original Ethernet frame 933 is transmitted to host 940.

As described above, the logical FC switches within the physical VCS member switches may send control frames to one another (for example, to update the VCS global configuration database or to notify other switches of the learned MAC addresses). In one embodiment, such control frames can be FC control frames encapsulated in a TRILL header and an outer Ethernet header. For example, if the logical FC switch in switch 944 is in communication with the logical FC switch in switch 938, switch 944 can sends a TRILL-encapsulated FC control frame 942 to switch 946. Switch 946 can forward frame 942 just like a regular data frame, since switch 946 is not concerned with the payload in frame 942.

Advanced Link Tracking

Today's server virtualization infrastructure (e.g. a Hypervisor, also called virtual machine monitor) typically provides one or more virtual switches (also called virtual Ethernet bridges, VEBs) within a physical server. Each virtual switch serves a number of virtual machines. When a number of such servers connect to a VCS, the number of communication sessions among the virtual machines can be quite large. In such a network environment, when a network link or port fails, the failure would typically disrupt the reachability to one or more virtual machines. This disruption can affect the communication sessions of some of the virtual machines. In conventional networks, such reachability disruption only triggers a topology change and/or MAC address learning update in the network, and the source virtual machines are not notified about these updates. Correspondingly, with conventional technologies, there is no way for a Hypervisor to re-configure the connectivity of the virtual machines absent of some signaling from the network via proprietary protocols.

Embodiments of the present invention facilitate advanced link tracking by monitoring any reachability disruption in the network and notifying the affected hypervisor. In response, the hypervisor can re-configure the connectivity of the virtual machines under its control to bypass the failed link or port. In one embodiment, this advanced link tracking function can be carried out in a logical VCS access layer.

Figure 10:
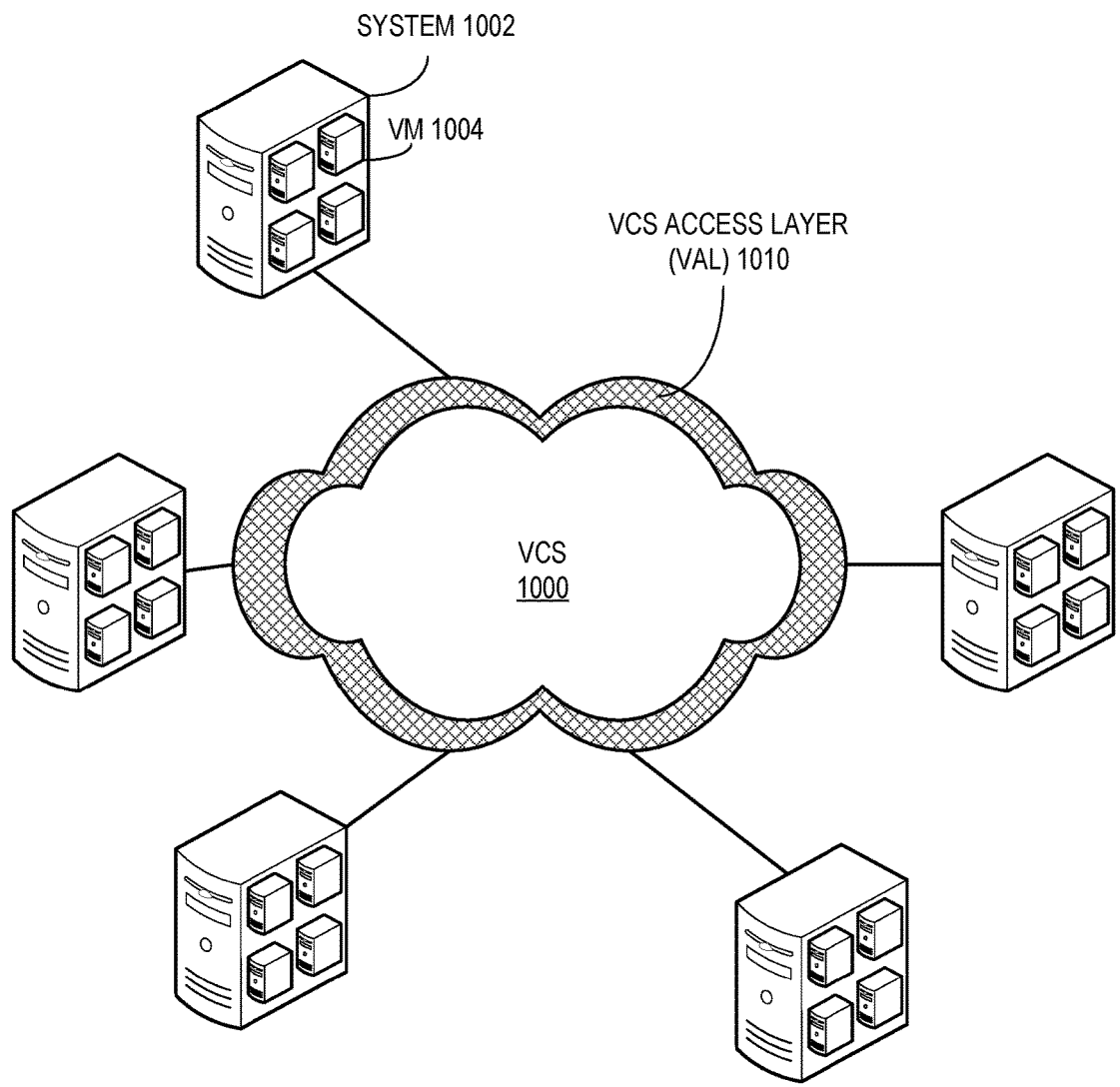
FIG. 10 illustrates a logical VCS access layer (VAL) which facilitates advanced link tracking, in accordance with one embodiment of the present invention.

FIG. 10 illustrates a logical VCS access layer (VAL) which facilitates advanced link tracking, in accordance with one embodiment of the present invention. In this example, a VCS 1000 is coupled with a number of physical server systems, such as system 1002. Each physical server system runs a number of virtual machines (VMs, also called virtual servers). For example, system 1002 includes four VMs, one of which is VM 1004. A VM may be dedicated to a certain application (e.g., instant messaging services, directory services, data base applications, etc.) and may have its own requirement on the network. A cluster of VMs running certain applications may communicate with another cluster of VMs across VCS 1000.

The switches within VCS 100 which are coupled externally to the physical end-host systems form a logical VCS access layer (VAL) 1010. In some embodiments, the advanced link tracking functions can be partly carried out in VAL 1010. During operation, any link state change that affects end-host reachability can be notified to the affected end hosts via VAL 1010. As described in detail below, when the reachability via an egress port is lost, this information is communicated to the physical servers which contain VMs in communication with the affected end hosts.

Figure 11:
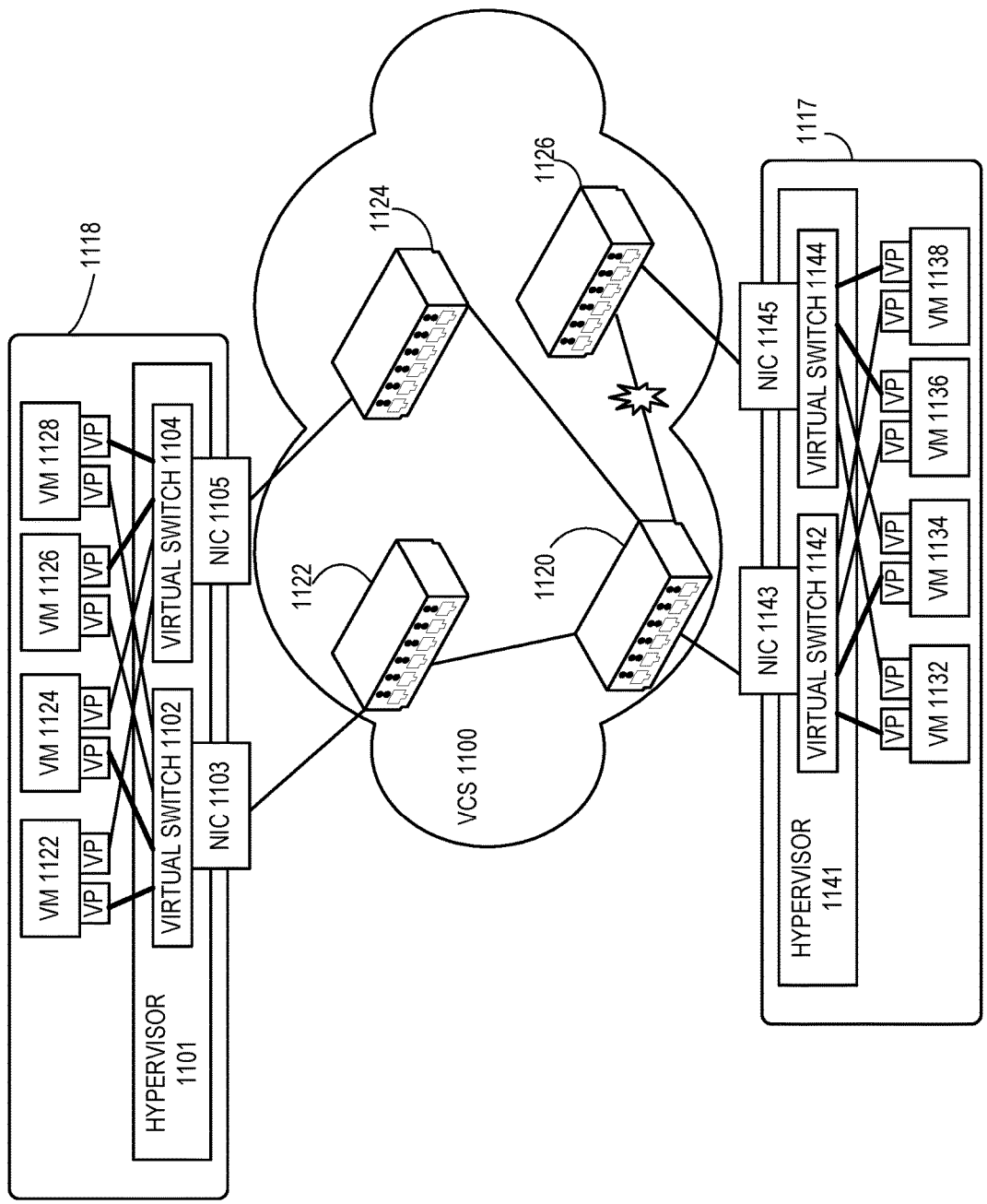
FIG. 11 illustrates an exemplary configuration of advanced link tracking in a VCS, in accordance with one embodiment of the present invention.

FIG. 11 illustrates an exemplary configuration of advanced link tracking in a VCS, in accordance with one embodiment of the present invention. In this example, a VCS 1100 includes four switches (which can be RBridges), 1120, 1122, 1124, and 1126. A physical server 1118 is coupled to both switches 1122 and 1124 via two network interface cards (NICs), 1103 and 1105, respectively. Physical server 1118 hosts four VMs, 1122, 1124, 1126, and 1128, which are managed by a hypervisor 1101. Hypervisor 1101 provides two virtual switches, 1102 and 1104. Each VM has two virtual ports (VPs), and is coupled to both virtual switches 1102 and 1104 via the VPs. In other words, each VM within physical server 1118 is dual-homed with virtual switches 1102 and 1104. This configuration provides redundancy to each VM, so that when one of the physical NICs (i.e., NIC 1103 or 1105) fails, hypervisor 1101 can instruct the VMs to use the other working NIC. During normal operation, for load-balancing purposes, VMs 1122 and 1124 are configured to communicate via virtual switch 1102, and VMs 1126 and 1128 are configured to communicate via virtual switch 1104.

Also coupled to VCS 1100 is physical servers 1117, which has a similar configuration as server 1118. Server 1117 includes four VMs, 1132, 1134, 1136, and 1138. These four VMs are each dual-homed with virtual switches 1142 and 1144, which are provided by hypervisor 1141. Virtual switch 1142 is coupled to VCS member switch 1120 via a NIC 1143, and virtual switch 1144 is coupled to VCS member switch 1126 via a NIC 1145. During normal operation, VMs 1132 and 1134 communicate with VCS 1100 via virtual switch 1142 and NIC 1143, and VMs 1136 and 1138 communicate with VCS 1100 via virtual switch 1144 and NIC 1145.

Assume that VMs 1122 and 1124 are in communication with VMs 1136 and 1138. Since VMs 1136 and 1138 are configured by hypervisor 1141 to use virtual switch 1144 and NIC 1145, the traffic between VMs 1122 and 1124 and VMs 1136 and 1138 is normally carried by VCS member switch 1126. Now, assume the link between switches 1120 and 1126 fails. As a result, VMs 1136 and 1138 can no longer be reached via NIC 1145. In embodiments of the present invention, this rechability update information is not only reflected in the VCS topology update (which is handled by the routing protocol within VCS 1100), but also communicated to hypervisor 1101 via NIC 1103. This update can allow hypervisor 1101 to quickly re-configure VMs 1122 and 1124, so that these two VMs use virtual switch 1104 and NIC 1105 to access VCS 1100. This way, the traffic from VMs 1122 and 1124 can still reach VMs 1136 and 1138 via switch 1124, switch 1120, NIC 1143, and virtual switch 1142. The new data path bypasses the failed link between switches 1120 and 1126. This re-configuration can take place shortly after the link failure is detected, thereby facilitating fast recovery at the source VMs.

Figure 12:
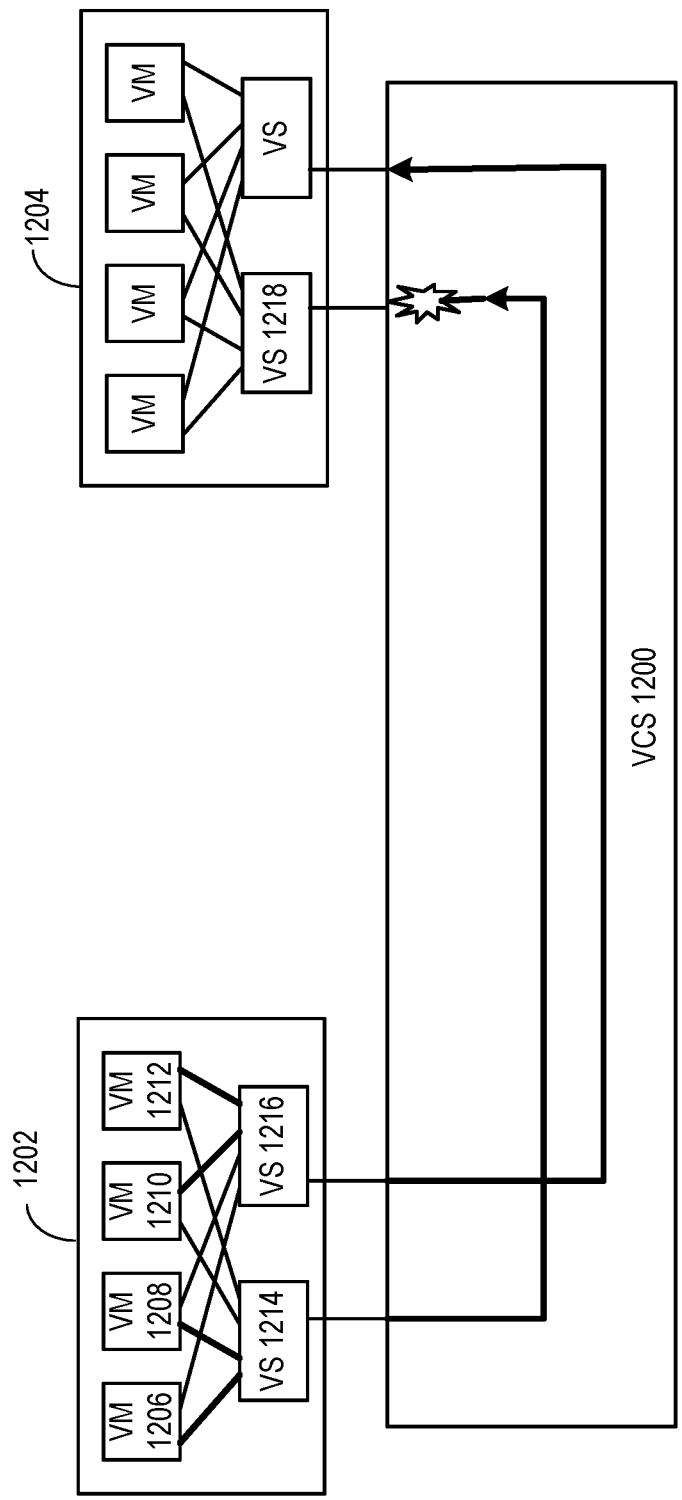
FIG. 12 illustrates an example where advanced link tracking allows virtual machines to re-route egress traffic when a link fails, in accordance with one embodiment of the present invention.

FIG. 12 illustrates an example where advanced link tracking allows virtual machines to re-route egress traffic when a link fails, in accordance with one embodiment of the present invention. In this example, two servers 1202 and 1204 are coupled to a VCS 1200. Server 1202 hosts four VMs, 1206, 1208, 1210, and 1212, all of which are dual-homed with virtual switches 1214 and 1216. During operation, VMs 1206 and 1208 access VCS 1200 via VS 1214, and VMs 1210 and 1212 access VCS 1200 via VS 1216. Server 1204 have a similar configuration as server 1202. Assume that throughout VCS 1200 there is only one path leading from VS 1214 to VS 1218 in server 1204. Assume further that during operation the egress port coupling to VS 1218 in server 1204 fails. As a result, VS 1218 is no longer reachable from VS 1214. The advanced link tracking mechanism can notify VS 1214 of the lost reachability to VS 1218. In one embodiment, VCS 1200 can communicate with a third entity which maintains the connectivity-pattern information among all the VMs (such as the vCenter by VMware) to obtain information on the affected VMs. In further embodiments, VCS 1200 can notify every external port of the lost reachability, and let the individual hypervisor to determine whether re-configuration of the VM-to-VS connectivity is necessary.

Figure 13:
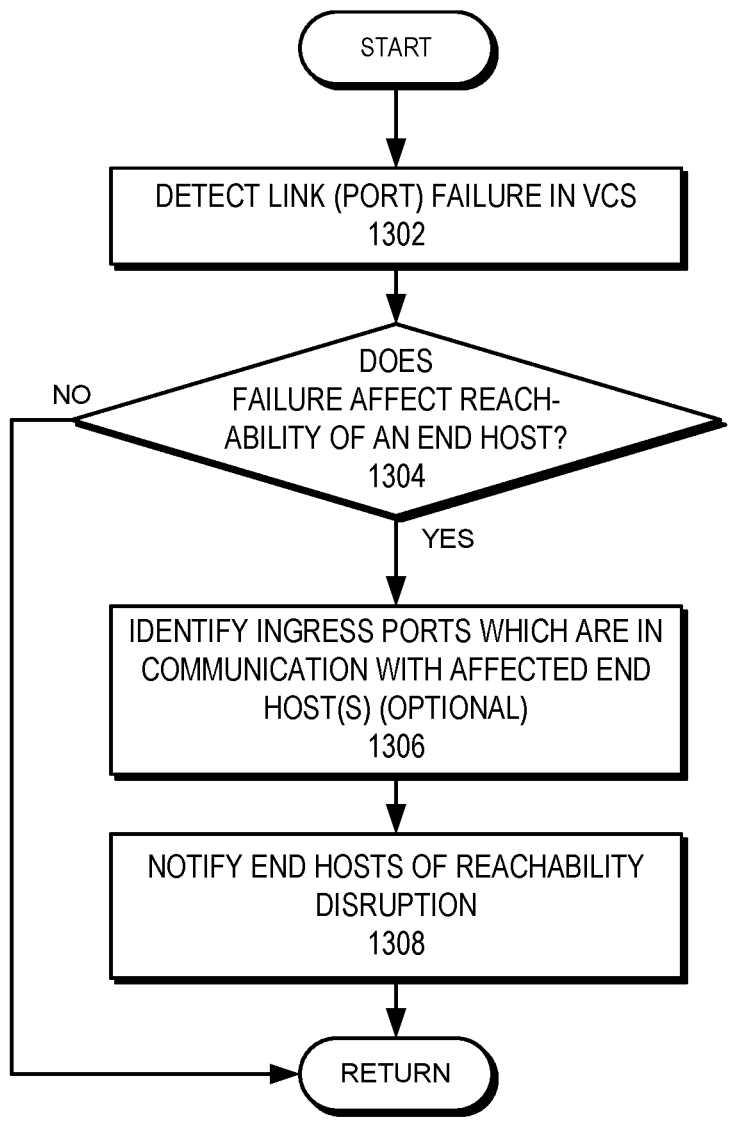
FIG. 13 presents a flowchart illustrating the process of advance link tracking, in accordance with one embodiment of the present invention.

FIG. 13 presents a flowchart illustrating the process of advance link tracking, in accordance with one embodiment of the present invention. During operation, the system first detects a link (or port) failure in the VCS (operation 1302). The system then determines whether the failure affects reachability of an end host (operation 1304). If the failure does not affect reachability of any end host, it is assumed that VCS can recover from the failure after its topology converges and the routing protocol updates every switch's forwarding table. If the reachability of an end host is affected, the system then optionally identifies ingress port(s) which are in communication with the affected end host(s) (operation 1306). Subsequently, the system notifies the end hosts via the ingress ports of the reachability disruption (operation 1308).

Exemplary VCS Member Switch with Advanced Link Tracking

Figure 14:
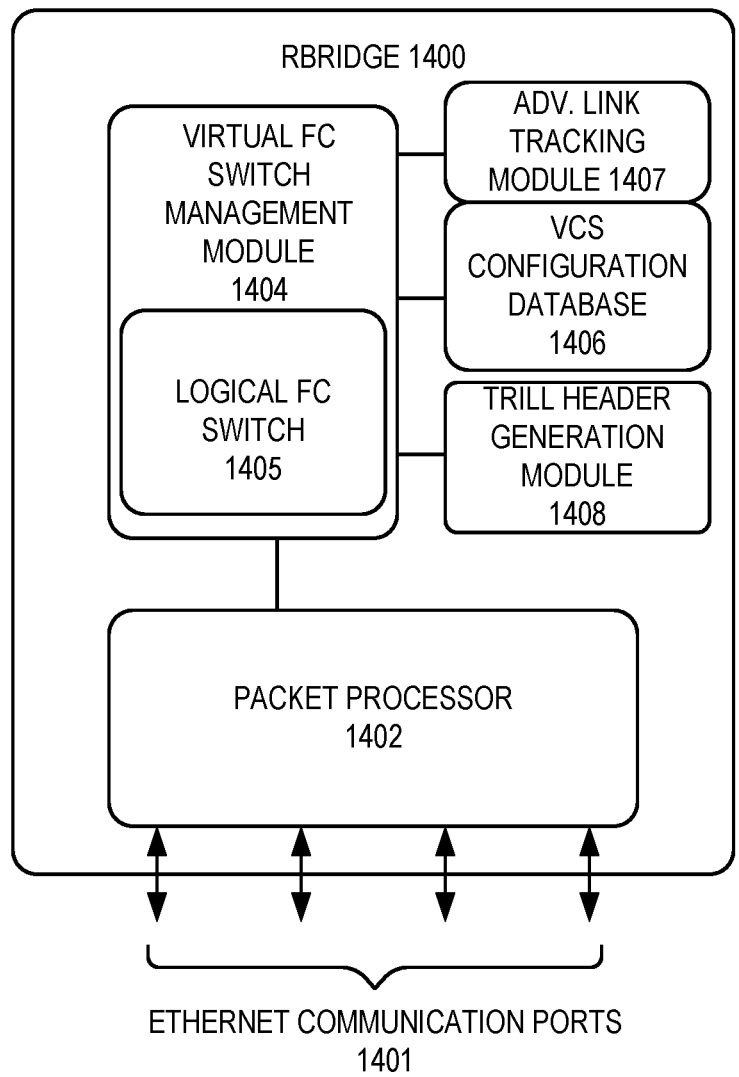
FIG. 14 illustrates an exemplary switch that facilitates virtual cluster switching and advanced link tracking, in accordance with one embodiment of the present invention.

FIG. 14 illustrates an exemplary VCS member switch, in accordance with one embodiment of the present invention. In this example, the VCS member switch is a TRILL RBridge 1400 running special VCS software. RBridge 1400 includes a number of Ethernet communication ports 1401, which can be coupled to one or more servers hosting virtual machines and which can transmit and receive Ethernet frames and/or TRILL encapsulated frames. Also included in RBridge 1400 is a packet processor 1402, a virtual FC switch management module 1404, a logical FC switch 1405, a VCS configuration database 1406, an advanced link tracking module 1407, and a TRILL header generation module 1408.

During operation, packet processor 1402 extracts the source and destination MAC addresses of incoming frames, and attaches proper Ethernet or TRILL headers to outgoing frames. Virtual FC switch management module 1404 maintains the state of logical FC switch 1405, which is used to join other VCS switches using the FC switch fabric protocols. VCS configuration database 1406 maintains the configuration state of every switch within the VCS. TRILL header generation module 1408 is responsible for generating property TRILL headers for frames that are to be transmitted to other VCS member switches.

Upon learning about disrupted reachability in the VCS, advanced link tracking module 1407 identifies the port(s) which are affected by the disruption, and notifies the hypervisor of the disruption. This notification can allow the hypervisor to expedite the re-configuration of the affected VMs and minimize service disruption. Furthermore, advanced link tracking module 1407 also monitors the health of all the links corresponding to ports 1401. Upon detection of any link or port failure, advanced link tracking module 1407 can notify other switches in the VCS of the link state change and any reachability disruption.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch, comprising:
    one or more ports;
    a link tracking module configured to:
        detect a failure which affects reachability between the switch and a second switch in a network of interconnected switches, wherein the network of interconnected switches is identified by a fabric identifier;
        in response to determining that the failure affects reachability to an end host, identify a port via which the end host is reachable; and
        use the identified port as an egress port for a notification message comprising information regarding the failure.

2. The switch of claim 1, in response to determining that the failure does not affect reachability to the end host, the link tracking module is further configured to determine that a routing update in the network of interconnected switches can resolve the failure.

3. The switch of claim 1, wherein reachability to the end host affects reachability to a virtual machine hosted in the end host, and wherein the notification message is destined to a hypervisor running the virtual machine to allow the hypervisor to reconfigure the virtual machine.

4. The switch of claim 3, wherein the link tracking module is further configured to construct a second notification message comprising reachability information associated with the failure, wherein the second notification message is destined to a second hypervisor residing in a second end host.

5. The switch of claim 3, wherein the reachability to the virtual machine includes reachability between the virtual machine and a second virtual machine.

6. The switch of claim 1, wherein the link tracking module is further configured to monitor a link between the switch and the second switch for failure.

7. The switch of claim 1, further comprising an encapsulation module configured to encapsulate a packet with an encapsulation header, wherein the encapsulated packet is forwardable in the network of interconnected switches based on the encapsulation header.

8. A method, comprising:
   detecting a failure which affects reachability between a switch and a second switch in a network of interconnected switches, wherein the network of interconnected switches is identified by a fabric identifier;
   in response to determining that the failure affects reachability to an end host, identifying a port via which the end host is reachable; and
   using the identified port as an egress port for a notification message comprising information regarding the failure.

9. The method of claim 8, further comprising, in response to determining that the failure does not affect reachability to the end host, determining that a routing update in the network of interconnected switches can resolve the failure.

10. The method of claim 8, wherein reachability to the end host affects reachability to a virtual machine hosted in the end host, and wherein the notification message is destined to a hypervisor running the virtual machine to allow the hypervisor to reconfigure the virtual machine.

11. The method of claim 10, further comprising constructing a second notification message comprising reachability information associated with the failure, wherein the second notification message is destined to a second hypervisor residing in a second end host.

12. The method of claim 10, wherein the reachability to the virtual machine includes reachability between the virtual machine and a second virtual machine.

13. The method of claim 8, further comprising monitoring a link between the switch and the second switch for failure.

14. The method of claim 8, further comprising encapsulating a packet with an encapsulation header, wherein the encapsulated packet is forwardable in the network of interconnected switches based on the encapsulation header.

15. A non-transitory computer-readable storage medium storing instructions that when executed by a computer cause the computer to perform a method, the method comprising:
   detecting a failure which affects reachability between a switch and a second switch in a network of interconnected switches, wherein the network of interconnected switches is identified by a fabric identifier;
   in response to determining that the failure affects reachability to an end host, identifying a port via which the end host is reachable; and
   using the identified port as an egress port for a notification message comprising information regarding the failure,
   wherein the notification message is destined to a hypervisor running a virtual machine to allow the hypervisor to reconfigure the virtual machine.

16. The non-transitory computer-readable storage medium of claim 15, wherein the method further comprises, in response to determining that the failure does not affect reachability to the end host, determining that a routing update in the network of interconnected switches can resolve the failure.

17. The non-transitory computer-readable storage medium of claim 15, wherein reachability to the end host affects reachability to a virtual machine hosted in the end host, and wherein the notification message is destined to a hypervisor running the virtual machine to allow the hypervisor to reconfigure the virtual machine.

18. The non-transitory computer-readable storage medium of claim 17, wherein the method further comprises constructing a second notification message comprising reachability information associated with the failure, wherein the second notification message is destined to a second hypervisor residing in a second end host.

19. The non-transitory computer-readable storage medium of claim 15, wherein the method further comprises monitoring a link between the switch and the second switch for failure.

20. The non-transitory computer-readable storage medium of claim 15, wherein the method further comprises encapsulating a packet with an encapsulation header, wherein the encapsulated packet is forwardable in the network of interconnected switches based on the encapsulation header.

* * * * *